United States Patent
Takeda et al.

(10) Patent No.: US 9,893,863 B2
(45) Date of Patent: Feb. 13, 2018

(54) DETERMINING UL RADIO RESOURCES FOR DELIVERY ACKNOWLEDGEMENT INFORMATION OF A DSCH WHEN A PLURALITY OF RESOURCE SETS OF AN ENHANCED DCCH ARE CONFIGURED

(71) Applicant: NTT DOCOMO, INC., Tokyo (JP)

(72) Inventors: Kazuaki Takeda, Tokyo (JP); Satoshi Nagata, Tokyo (JP); Yoshihisa Kishiyama, Tokyo (JP); Qin Mu, Beijing (CN); Liu Liu, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 66 days.

(21) Appl. No.: 14/416,186

(22) PCT Filed: Jul. 22, 2013

(86) PCT No.: PCT/JP2013/069804
§ 371 (c)(1),
(2) Date: Jan. 21, 2015

(87) PCT Pub. No.: WO2014/017441
PCT Pub. Date: Jan. 30, 2014

(65) Prior Publication Data
US 2015/0229454 A1  Aug. 13, 2015

(30) Foreign Application Priority Data
Jul. 23, 2012 (JP) .................................. 2012-162820

(51) Int. Cl.
*H04L 5/00* (2006.01)
*H04W 72/04* (2009.01)
(Continued)

(52) U.S. Cl.
CPC ........ *H04L 5/0055* (2013.01); *H04B 7/0452* (2013.01); *H04L 1/00* (2013.01); *H04W 72/042* (2013.01); *H04W 28/06* (2013.01)

(58) Field of Classification Search
CPC ....... H04L 5/0055; H04L 1/00; H04B 7/0452; H04W 72/042; H04W 28/06
See application file for complete search history.

(56) References Cited

U.S. PATENT DOCUMENTS

| 8,520,620 B2 | 8/2013 | Ji et al. | |
| 2011/0268062 A1* | 11/2011 | Ji | H04L 5/0055 370/329 |
| 2013/0003639 A1* | 1/2013 | Noh | H04L 5/0053 370/312 |

(Continued)

FOREIGN PATENT DOCUMENTS

WO    2011/136523 A2    11/2011

OTHER PUBLICATIONS

Samsung; "ACK/NACK PUCCH resource compression in TDD"; 3GPP TSG RAN WG1 Meeting #54, R1-082862; Jeju, Korea; Aug. 18-22, 2008 (2 pages).*

(Continued)

*Primary Examiner* — Ian N Moore
*Assistant Examiner* — Justin T Van Roie
(74) *Attorney, Agent, or Firm* — Osha Liang LLP

(57) ABSTRACT

A system and method for allocating adequate uplink radio resources for delivery acknowledgement information of a downlink shared data channel when downlink control information is transmitted using an enhanced downlink control channel is disclosed. A radio base station configures a plurality of enhanced PDCCH sets, which are each formed to include a plurality of enhanced control channel elements (eCCEs) allocated to the enhanced downlink control channel, for a user terminal, the radio base station transmits, to the user terminal, the downlink control information, to (Continued)

which resource identifiers (ARIs) are added, the resource identifiers being different between the plurality of enhanced PDCCH sets, and the user terminal determines radio resources for an uplink control channel that are used to transmit delivery acknowledgment information of the downlink shared data channel, based on offset values that are associated with the resource identifiers (ARIs).

10 Claims, 16 Drawing Sheets

(51) Int. Cl.
    *H04L 1/00*           (2006.01)
    *H04B 7/0452*       (2017.01)
    *H04W 28/06*        (2009.01)

(56) References Cited

U.S. PATENT DOCUMENTS

| | | | | |
|---|---|---|---|---|
| 2015/0181573 A1* | 6/2015 | Takeda | ............... | H04W 72/042 370/329 |
| 2015/0282129 A1* | 10/2015 | Takeda | ............... | H04L 1/0046 370/329 |
| 2016/0157213 A1* | 6/2016 | Takeda | ............... | H04L 1/1822 370/329 |

OTHER PUBLICATIONS

Office Action issued in corresponding Japanese Application No. 2012-162820, dated Mar. 17, 2015 (6 pages).
NTT DOCOMO; "Design Principle for E-PDCCH Multiplexing"; 3GPP TSG RAN WG1 Meeting #69, R1-121976; Prague, Czech Republic; May 21-25, 2012 (3 pages).
Samsung; "HARQ-ACK PUCCH Resources in Response to ePDCCH Detections"; 3GPP TSG RAN WG1 #69, R1-122259; Prague, Czech Republic; May 21-25, 2012 (2 pages).
Samsung; "PUCCH Resource Allocation for UL CoMP"; 3GPP TSG RAN WG1 Meeting #69, R1-122247; Prague, Czech Republic; May 21-25, 2012 (3 pages).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).
Extended Search Report issued in corresponding European Application No. 138223433, dated Jan. 20, 2016 (8 pages).
Pantech; "PUCCH resource allocation in response to E-PDCCH"; 3GPP TSG RAN1 #69, R1-122456; Prague, Czech Republic; May 21-25, 2012 (3 pages).
International Search Report issued in PCT/JP2013/069804 dated Aug. 13, 2013 (2 pages).

\* cited by examiner

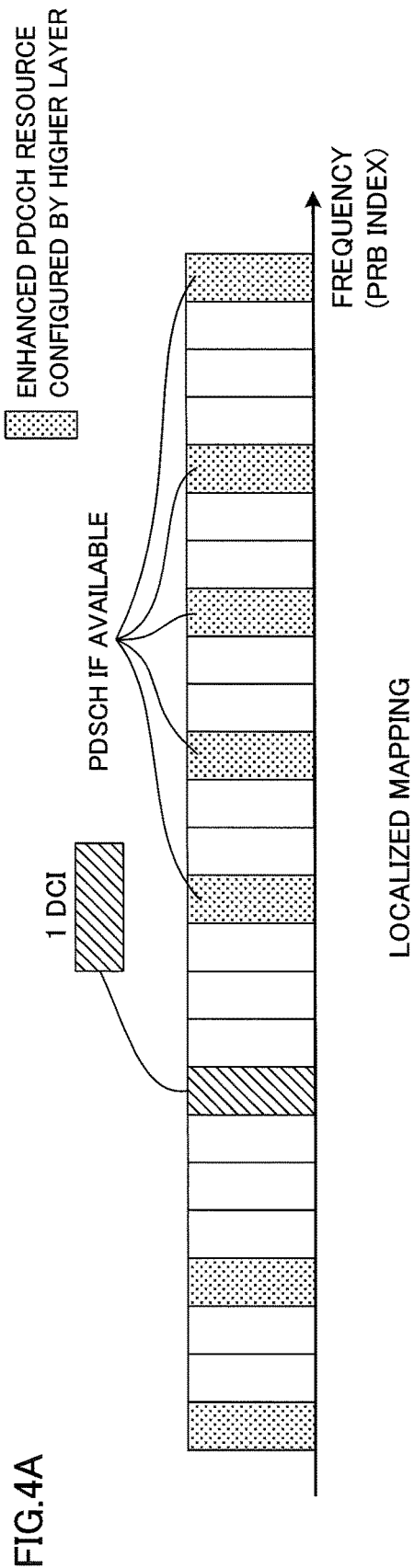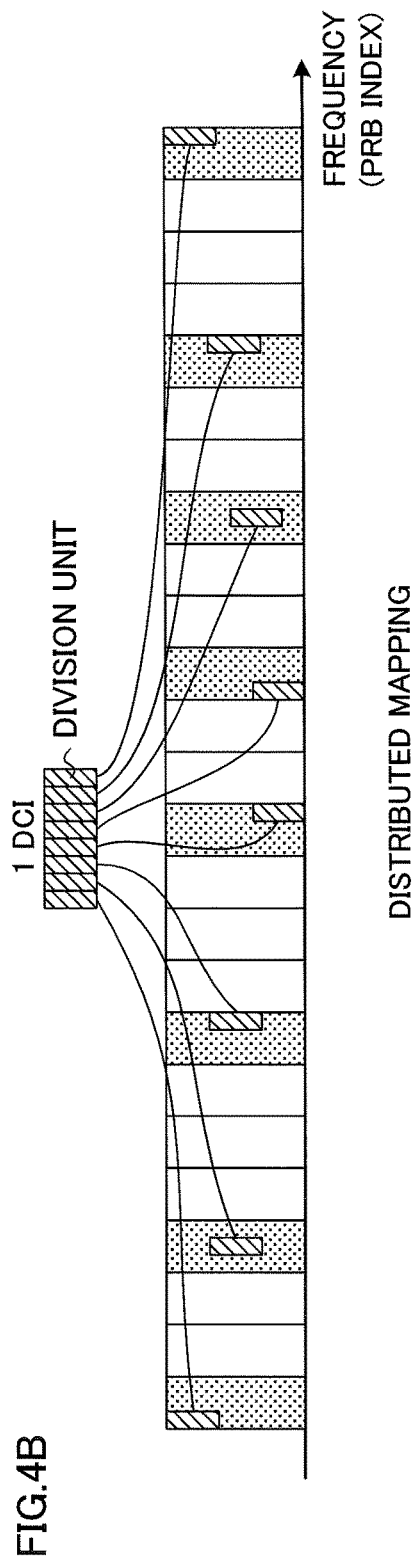

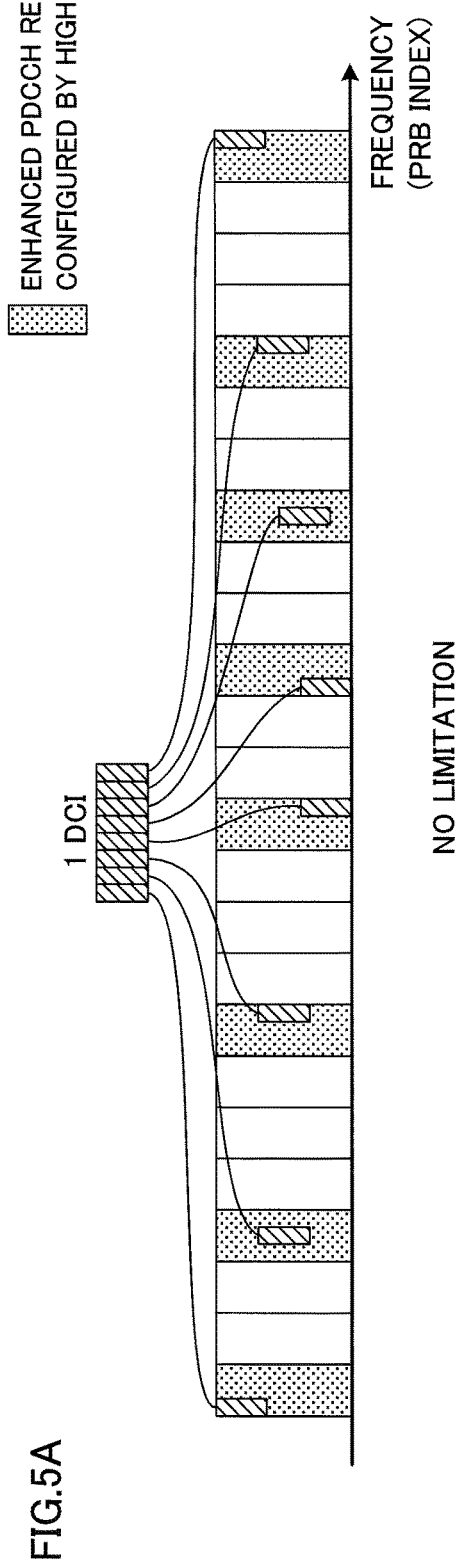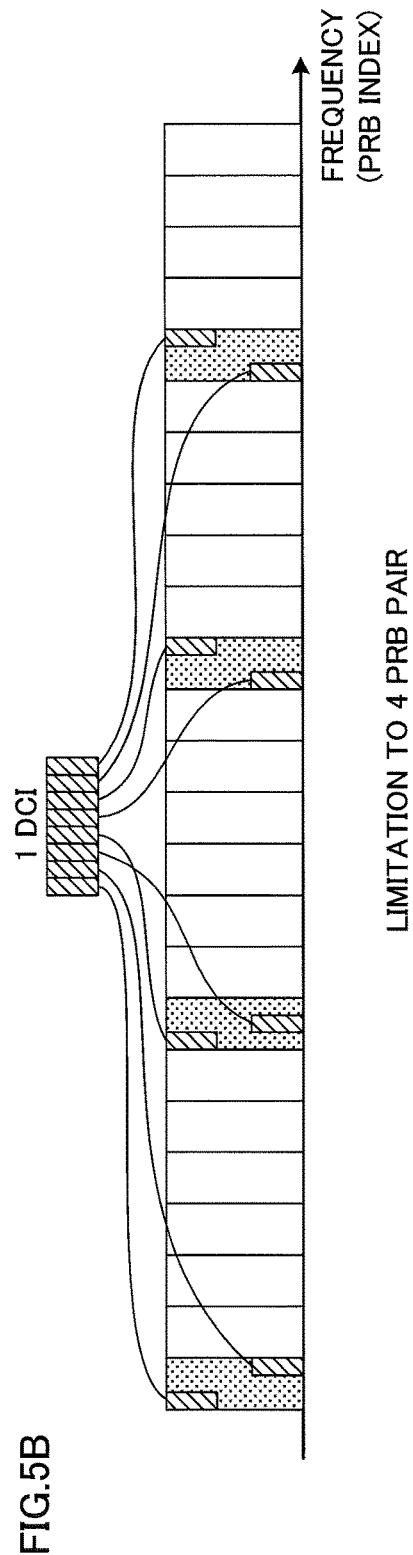
FIG.5A
FIG.5B

| AGGREGATION LEVEL | NUMBER OF BD TRIALS | |
|---|---|---|
| | ENHANCED PDCCH SET #1 | ENHANCED PDCCH SET #2 |
| 1 | 3 | 3 |
| 2 | 3 | 3 |
| 4 | 1 | 1 |
| 8 | 1 | 1 |
| TOTAL | 8 | 8 |

| AGGREGATION LEVEL | NUMBER OF BD TRIALS | |
|---|---|---|
| | ENHANCED PDCCH SET #x | ENHANCED PDCCH SET #y |
| 1 | 3 | 3 |
| 2 | 3 | 3 |
| 4 | 1 | 1 |
| 8 | 1 | 1 |
| TOTAL | 8 | 8 |

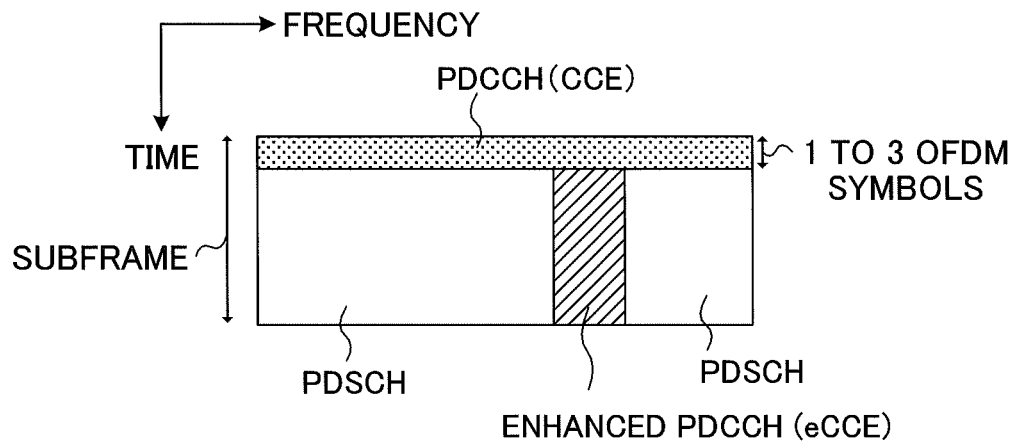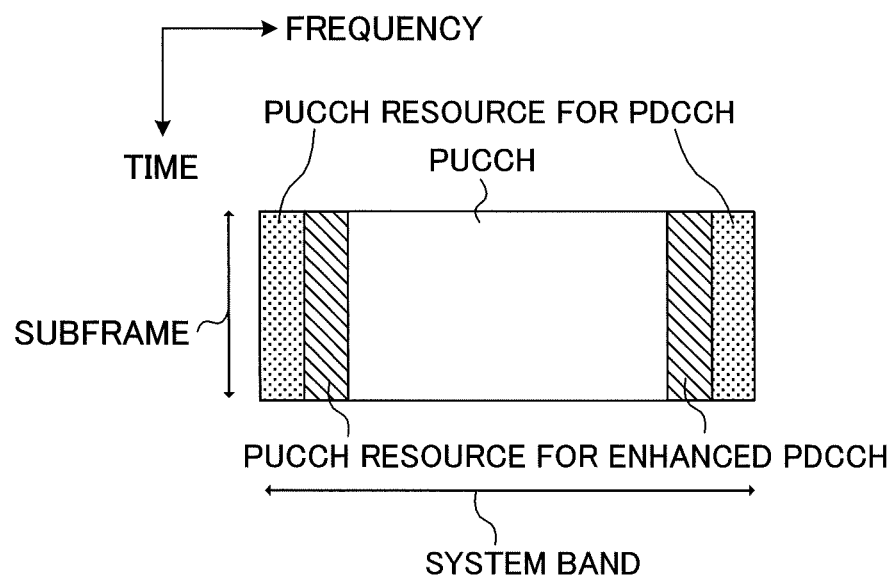
FIG.8

DETERMINING UL RADIO RESOURCES FOR DELIVERY ACKNOWLEDGEMENT INFORMATION OF A DSCH WHEN A PLURALITY OF RESOURCE SETS OF AN ENHANCED DCCH ARE CONFIGURED

TECHNICAL FIELD

The present invention relates to a radio communication method, a radio base station, a user terminal and a radio communication system in a next-generation radio communication system.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Also, successor systems of LTE (referred to as, for example, "LTE-advanced" or "LTE enhancement" (hereinafter referred to as "LTE-A")) are under study for the purpose of achieving further broadbandization and increased speed beyond LTE. In LTE (Rel. 8) and LTE-A (Rel. 9 and later versions), MIMO (Multi-Input Multi-Output) techniques are under study as radio communication techniques to transmit and receive data using a plurality of antennas, and improve spectral efficiency. According to MIMO techniques, a plurality of transmitting/receiving antennas are provided in a transmitter/receiver, so that different transmission information sequences are transmitted from different transmitting antennas at the same time.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

In future systems such as LTE-A, multiple-user MIMO (MU-MIMO) transmission to send transmission information sequences from different transmitting antennas to different users simultaneously, is under study. This MU-MIMO transmission is also applied to a HetNet (Heterogeneous Network) and CoMP (Coordinated Multi-Point) transmission. Meanwhile, in this future system, due to the shortage of the capacity of downlink control channels to transmit downlink control information, there is a threat that the characteristics of systems such as MU-MIMO transmission cannot be fully optimized.

So, it may be possible to expand a radio resource region for a downlink control channel and transmit more downlink control information. However, when downlink control information is transmitted using an expanded downlink control channel, there is a threat that adequate uplink radio resources cannot be allocated to the delivery acknowledgment information (ACK (Acknowledgement)/NACK (Negative Acknowledgement)/DTX (Discontinuous Transmission)) of a downlink shared data channel that is demodulated based on the downlink control information.

The present invention has been made in view of the above, and it is therefore an object of the present invention to provide a radio communication method, a radio base station, a user terminal and a radio communication system that can allocate adequate uplink radio resources for delivery acknowledgment information of a downlink shared data channel, which is demodulated based on a downlink control channel, when downlink control information is transmitted using the expanded downlink channel.

Solution to Problem

The radio communication method of the present invention provides a radio communication method in a radio communication system in which a radio base station transmits downlink control information using an enhanced downlink control channel that is frequency-division-multiplexed with a downlink shared data channel, and, in this radio communication system, the radio base station configures a plurality of resource sets, which are each formed to include a plurality of enhanced control channel elements allocated to the enhanced downlink control channel, for a user terminal, and the radio base station transmits, to the user terminal, the downlink control information, to which a resource identifier is added, the resource identifier being different between the plurality of resource sets, and the user terminal determines a radio resource for an uplink control channel that is used to transmit delivery acknowledgment information of the downlink shared data channel, based on an offset value that is associated with the resource identifier.

The radio base station of the present invention is a radio base station that transmits downlink control information using an enhanced downlink control channel that is frequency-division-multiplexed with a downlink shared data channel, and this radio base station has a configuration section configured to configure a plurality of resource sets, which are each formed to include a plurality of enhanced control channel elements allocated to the enhanced downlink control channel, for a user terminal, and a transmitting section configured to transmit, to the user terminal, the downlink control information, to which a resource identifier is added, the resource identifier being different between the plurality of resource sets, and, this resource identifier is associated with an offset value of a radio resource for an uplink control channel that is used to transmit delivery acknowledgment information of the downlink shared data channel.

The user terminal of the present invention provides a user terminal that receives downlink control information using an enhanced downlink control channel that is frequency-division-multiplexed with a downlink shared data channel, and this user terminal has a receiving section configured to receive, from a radio base station, the downlink control information, to which a resource identifier is added, the resource identifier being different between a plurality of resource sets, which are each formed to include a plurality of enhanced control channel elements allocated to the enhanced downlink control channel, and a determining section configured to determine a radio resource for an uplink control channel that is used to transmit delivery acknowledgment information of the downlink shared data channel, based on an offset value that is associated with the resource identifier.

The radio communication system of the present invention provides a radio communication system in which a radio base station transmits downlink control information using an enhanced downlink control channel that is frequency-division-multiplexed with a downlink shared data channel, and this radio communication system has the radio base station having a configuration section configured to configure a plurality of resource sets, which are each formed to include a plurality of enhanced control channel elements allocated to the enhanced downlink control channel, for a user terminal, and a transmission section configured to transmit, to the user terminal, the downlink control information, to which a resource identifier is added, the resource identifier being different between the plurality of resource sets, and, the user terminal having a determining section configured to determine a radio resource for an uplink control channel that is used to transmit delivery acknowledgment information of the downlink shared data channel, based on an offset value that is associated with the resource identifier.

Advantageous Effects of Invention

According to the present invention, when downlink control information is transmitted using an expanded downlink control channel, it is possible to allocate adequate uplink radio resources for delivery acknowledgment information of a downlink shared data channel that is demodulated based on the downlink control information. Particularly, when a plurality of resource sets for an expanded downlink control channel are configured for a user terminal, it is possible to prevent collisions of uplink radio resources between the plurality of resource sets, and also reduce the increase of overhead of uplink radio resources.

BRIEF DESCRIPTION OF DRAWINGS

FIG. 4 provides diagrams to explain mapping methods of an enhanced PDCCH;

FIG. 5 provides diagrams to show examples of distributed mapping of an enhanced PDCCH;

FIG. 8 provides diagrams to show examples of PUCCH resource allocation;

DESCRIPTION OF EMBODIMENTS

Figure 1:
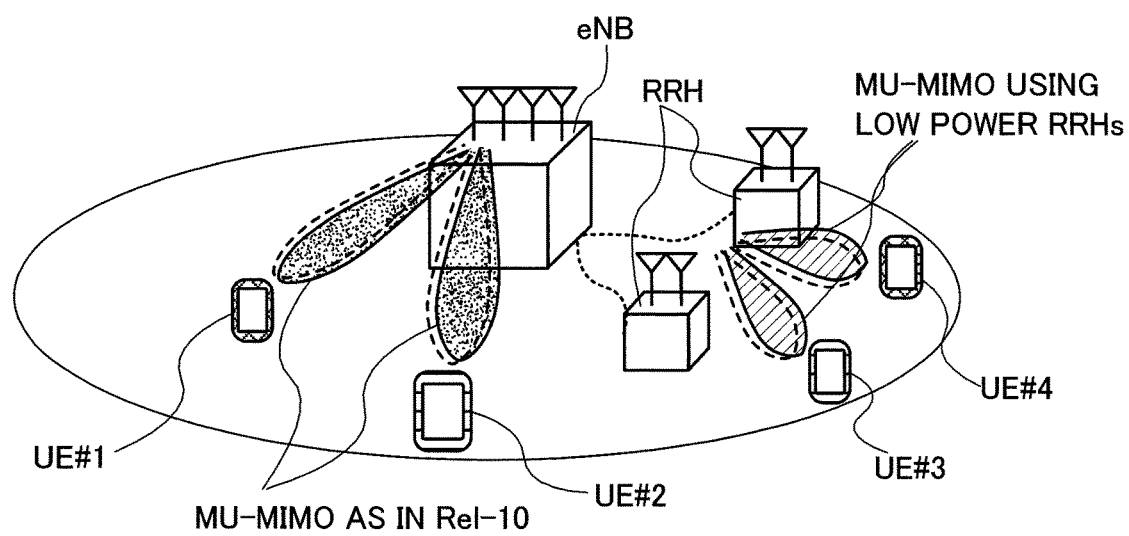
FIG. 1 is a schematic diagram of a radio communication system where MU-MIMO transmission is applied.

FIG. 1 is a diagram to show an example of a radio communication system where MU-MIMO transmission is applied. The system shown in FIG. 1 is structured in layers, by providing small base stations (for example, RRHs (Remote Radio Heads)) having local coverage areas in a coverage area of a radio base station (for example, eNB (eNodeB)). In downlink MU-MIMO transmission in this system, data for a plurality of user terminals UE (User Equipment) #1 and UE #2 is transmitted at the same time from a plurality of antennas of the radio base station. Also, from a plurality of antennas of a plurality of small base stations, data for a plurality of user terminals UE #3 and UE #4 is transmitted simultaneously.

Figure 2:
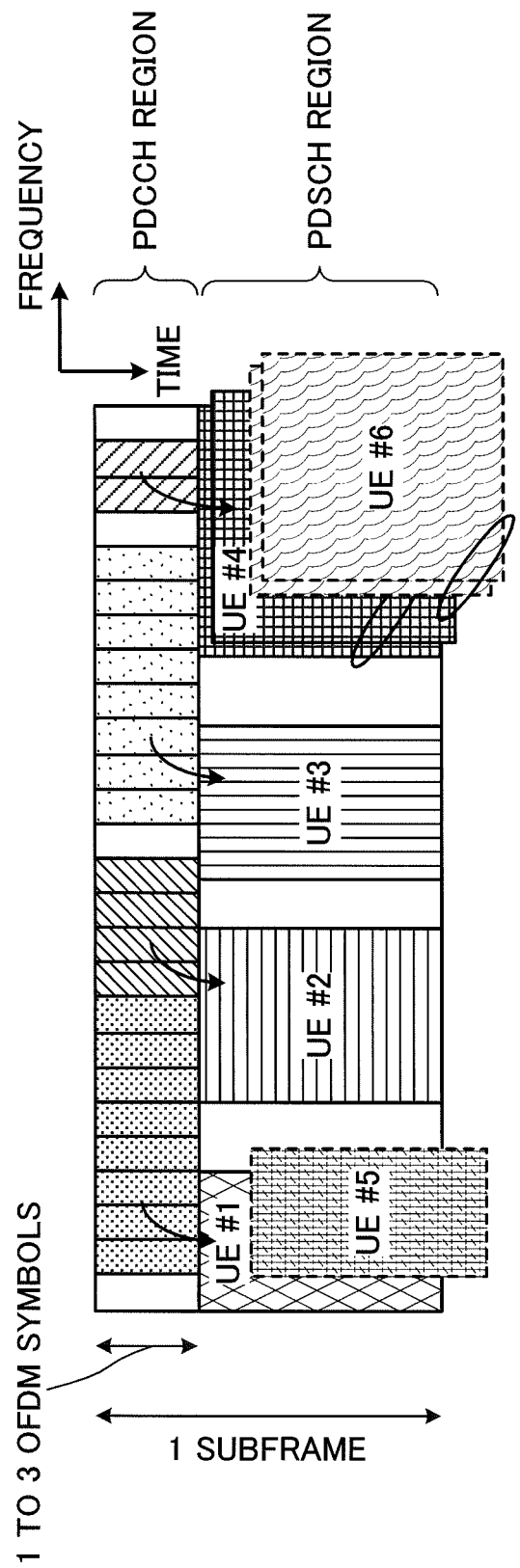
FIG. 2 is a diagram to show an example of a subframe where downlink MU-MIMO transmission is performed.

FIG. 2 is a diagram to show an example of a radio frame (for example, one subframe) where downlink MU-MIMO transmission is applied. As shown in FIG. 2, in a system where MU-MIMO transmission is applied, in each subframe, a predetermined number of OFDM symbols (maximum three OFDM symbols) from the top are secured as a radio resource region (PDCCH region) for a downlink control channel (PDCCH: Physical Downlink Control Channel). Also, a radio resource region (PDSCH region) for a downlink shared data channel (PDSCH: Physical Downlink Shared Channel) is secured in radio resources following the predetermined number of symbols from the subframe top.

In the PDCCH region, downlink control information (hereinafter referred to as "DCI") for user terminals UE (here, UE #1 to UE #4) is allocated. The DCI includes data allocation information for the user terminals UE in the PDSCH region and so on. For example, in FIG. 2, user terminal UE #2 receives data for user terminal UE #2 allocated to the PDSCH region based on the DCI for user terminal UE #2 allocated to the PDCCH region.

Also, in MU-MIMO transmission, it is possible to transmit data to a plurality of user terminals UE in the same time and in the same frequency. Consequently, in the PDSCH region of FIG. 2, it may be possible to multiplex data for user terminal UE #1 and data for user terminal UE #5 over the same frequency region. Similarly, it may be also possible to multiplex data for user terminal UE #4 and data for user terminal UE #6 over the same frequency region.

However, as shown in FIG. 2, even when an attempt is made to allocate data for user terminals UE #1 to UE #6 in the PDSCH region, cases might occur where the region for allocating DCI for all of user terminals UE #1 to UE #6 cannot be secured in the PDCCH region. For example, in the PDCCH region of FIG. 2, the DCI for user terminals UE #5 and UE #6 cannot be allocated. In this case, the number of user terminals UE to multiplex over the PDSCH region is limited due to the shortage of the PDCCH region for allocating DCI, and therefore there is a threat that it is not possible to achieve, sufficiently, the effect of improving the efficiency of use of radio resources by MU-MIMO transmission.

As a method to solve this shortage of the PDCCH region, it may be possible to expand the PDCCH allocation region outside the control region of maximum three OFDM symbols from the top of a subframe (that is, extend the PDCCH region into the conventional PDSCH region from the fourth OFDM symbol onward). As for the method of extending the PDCCH region, a method of time-division-multiplexing the PDSCH and the PDCCH in the conventional PDSCH region, as shown in FIG. 3A (TDM approach), and a method of frequency-division-multiplexing the PDSCH and the PDCCH in the conventional PDSCH region, as shown in FIG. 3B (FDM approach) may be possible.

Figure 3A:
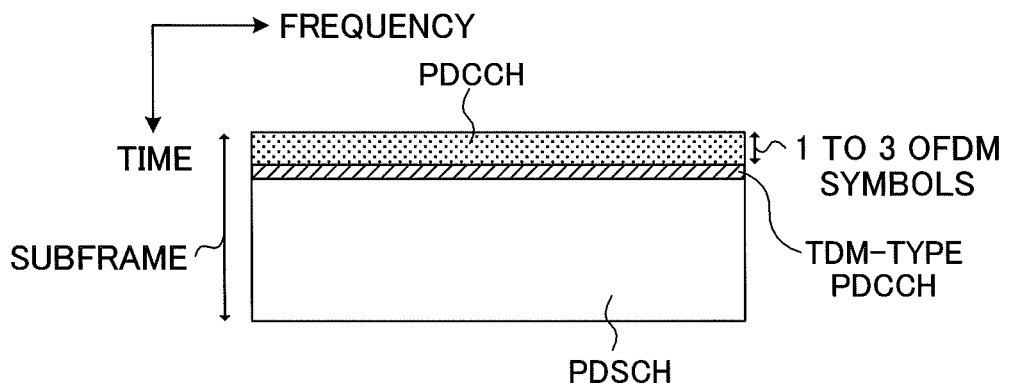
FIG. 3 provides diagrams to explain subframe structures of an enhanced PDCCH.
Figure 3B:
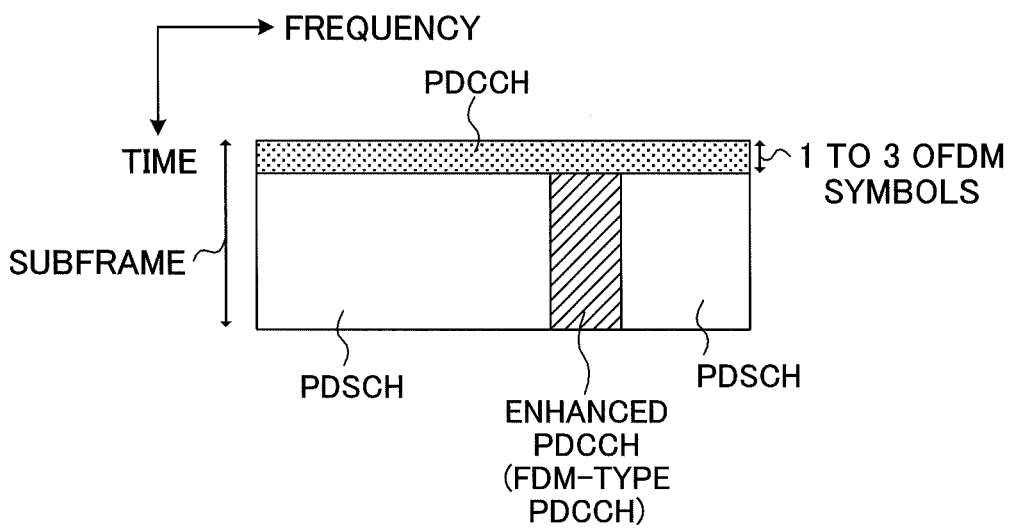

In the TDM approach shown in FIG. 3A, the PDCCH is placed over the entire system band in part of the OFDM symbols from the fourth OFDM symbol in the subframe. Meanwhile, in the FDM approach shown in FIG. 3B, the PDCCH is placed in part of the system band in all of the OFDM symbols from the fourth OFDM symbol in the subframe. This PDCCH, frequency-division-multiplexed with the PDSCH in the FDM approach, is demodulated using a demodulation reference signal (DM-RS), which is a user-specific reference signal. Consequently, DCI that is transmitted in this PDCCH can achieve beam-forming gain, like downlink data that is transmitted in the PDSCH does, and therefore it is effective to increase the capacity of the PDCCH. In the future, it is expected that this FDM approach will gain greater importance.

Hereinafter, the PDCCH that is frequency-division-multiplexed with the PDSCH in the FDM approach will be referred to as an "enhanced PDCCH." This enhanced PDCCH may also be referred to as an "enhanced downlink control channel (enhanced physical downlink control channel)," an "ePDCCH," an "E-PDCCH," an "FDM-type PDCCH," a "UE-PDCCH," and so on.

For the enhanced PDCCH in the FDM approach such as described above, localized mapping and distributed mapping are studied as DCI mapping methods. FIG. 4 provides diagrams to explain mapping methods of DCI in an enhanced PDCCH. FIG. 4A shows localized mapping, and FIG. 4B shows distributed mapping.

As shown in FIGS. 4A and 4B, enhanced PDCCH resources are comprised of a predetermined number of resource blocks (hereinafter referred to as "PRB (Physical Resource Block) pairs") that are distributed over the system band. A PRB pair is formed with two PRBs that are consecutive along the time direction, and is identified by a PRB index that is assigned along the frequency direction. A plurality of PRB pairs to constitute the enhanced PDCCH are determined by a higher layer. The PRB indices to identify each of the plurality of PRB pairs are reported to a user terminal UE through higher layer signaling. Also, in some cases, a plurality of PRB pairs to constitute the enhanced PDCCH are determined in advance by specifications.

As shown in FIG. 4A, in localized mapping, one piece of DCI is mapped to a specific PRB pair constituting the enhanced PDCCH, in a localized manner. To be more specific, one piece of DCI is mapped to one PRB pair (for example, the PRB pair of the best channel quality), based on CQIs fed back from a user terminal UE. Localized mapping can achieve frequency scheduling gain by using CQIs. Note that, in FIG. 4A, among a plurality of PRB pairs constituting the enhanced PDCCH, the PDSCH may be mapped to those PRB pairs where no DCI is mapped.

As shown in FIG. 4B, in distributed mapping, one piece of DCI is mapped to a plurality of PRB pairs constituting the enhanced PDCCH in a distributed manner. To be more specific, one piece of DCI is divided into a plurality of division units, and each division unit is mapped to the above plurality of PRB pairs (or to all the PRB pairs), in a distributed manner. Distributed mapping can achieve frequency diversity gain by distributing one piece of DCI over the system band.

In this way, in distributed mapping, unlike localized mapping, each piece of DCI is divided into a plurality of division units, and the division units are mapped to a plurality of PRB pairs constituting the enhanced PDCCH in a distributed manner. Consequently, as shown in FIG. 5A, when the enhanced PDCCH is formed with many PRB pairs (in FIG. 5A, eight PRB pairs), an attempt to map only one piece of DCI results in deteriorated efficiency of use of radio resources. This is because the division units of one piece of DCI are mapped to many PRB pairs in a distributed manner and the number of PRB pairs where the PDSCH can be mapped decreases.

So, in distributed mapping, as shown in FIG. 5B, a study is in progress to limit the number of PRB pairs where the division units of one piece of DCI are mapped in a distributed manner. In FIG. 5B, the number of PRB pairs where the division units of one piece of DCI are mapped in a distributed manner is limited to four. Consequently, in FIG. 5B, compared with the case shown in FIG. 5A, the number of PRB pairs where the PDSCH can be mapped increases. A combination of a plurality of PRB pairs where the division units of one piece of DCI are mapped in a distributed manner is also referred to as an "enhanced PDCCH set" (an "ePDCCH set," an "E-PDCCH set," or simply a "set").

Figures 6A, 6B:
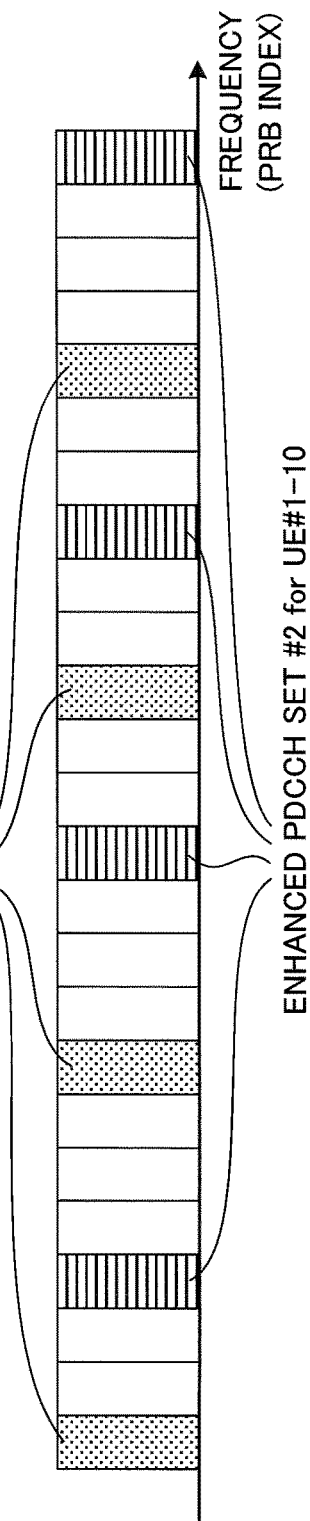
FIG. 6 provides diagrams to show an example of enhanced PDCCH sets.

Also, in distributed mapping, as shown in FIG. 6A, configuring a plurality of enhanced PDCCH sets for each user terminal UE is under study. In FIG. 6A, enhanced PDCCH sets #1 and #2 are allocated to each user terminal UE #1 to UE #10 in an overlapping manner. In FIG. 6A, when the number of user terminals UE to which DCI is transmitted, is smaller than a predetermined number, the DCI is mapped to only one enhanced PDCCH set #1, so that the other enhanced PDCCH set #2 can be used for the PDSCH. In this way, by configuring a plurality of enhanced PDCCH sets to each user terminal UE in an overlapping manner, it is possible to improve the efficiency of use of radio resources.

As shown in FIG. 6A, when enhanced PDCCH sets #1 and #2 are configured for each user terminal UE in an overlapping manner, each user terminal UE needs to blind-decode both of enhanced PDCCH sets #1 and #2. In this case, as shown in FIG. 6B, the number of candidate search spaces per enhanced PDCCH set may be configured not to increase the number of candidate search spaces for enhanced PDCCH sets #1 and #2 as a whole. By this means, even when each user terminal UE blind-decodes a plurality of enhanced PDCCH sets, it is possible to prevent the increase of the number of times of blind decoding.

Figures 7A, 7B:
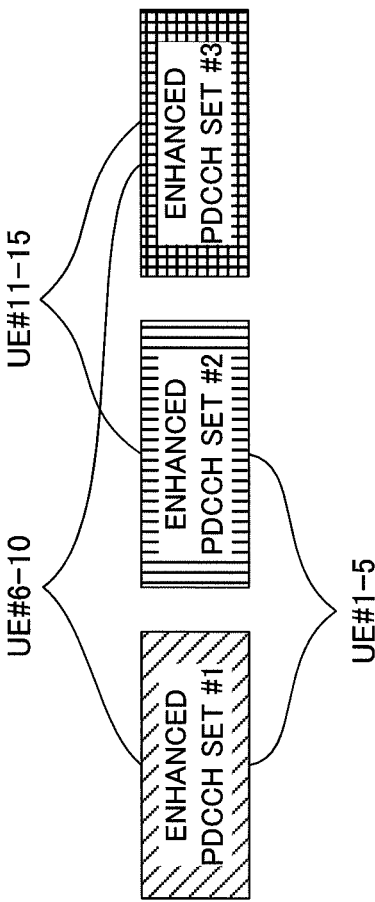
FIG. 7 provides diagrams to show another example of enhanced PDCCH sets.

Also, when a plurality of enhanced PDCCH sets are configured for each user terminal UE, as shown in FIG. 7A, a primary set and a secondary set may be configured for each user terminal UE. Here, the primary set is an enhanced PDCCH set that is configured for all of the user terminals UE in common, and may be used as a common search space (CSS). Meanwhile, the secondary set is an enhanced PDCCH set that is configured for at least one user terminal separately, and may be used as a dedicated search space (UE-specific SS).

In FIG. 7A, enhanced PDCCH set #1 is a primary set, and enhanced PDCCH set #2 is a secondary set for user terminals UE #1 to UE #8 and enhanced PDCCH set #3 is a secondary set for UE #9 to UE #15. In this case, as shown in FIG. 7B, the number of candidate search spaces for the primary set may be configured greater than the number of candidate search spaces for the secondary sets. By this means, it is possible to reduce the possibility of occurrence of blocking in the primary set that is blind-decoded by all of the user terminals UE.

Now, in an LTE system (Rel. 8) and the LTE-A systems of Rel. 10 and earlier versions, radio resources for an uplink control channel (PUCCH: Physical Uplink Control Channel) (hereinafter referred to as "PUCCH resources"), which is used to transmit PDSCH delivery acknowledgment information (ACK/NACK/DTX) (PUCCH formats 1a/1b), are determined based on the index numbers of control channel elements (CCEs) (hereinafter referred to as "CCE index numbers") allocated to the PDCCH. To be more specific, the PUCCH resources are determined as shown in equation 1.

Note that the CCE is a radio resource unit allocated to the PDCCH.

[Formula 1]

$$n_{PUCCH}^{(1,p)} = n_{CCE} + N_{PUCCH}^{(1)}$$ (Equation 1)

where:

$$n_{PUCCH}^{(1,p)}$$ [Formula 2]

is the PUCCH resources to transmit the above delivery acknowledgment information by an antenna port p. Also, $n_{CCE}$ is the minimum CCE index number used for DCI transmission. This minimum CCE index number is detected by blind-decoding PDCCH search spaces in the user terminal UE. Also, $$N_{PUCCH}^{(1)}$$ [Formula 3]

is a parameter reported to the user terminal UE through higher layer signaling. With above equation 1, radio resource regions at both ends of the system band are allocated to the PUCCH resources.

On the other hand, as described above, in the LTE-A systems of Rel. 11 and later versions, a study to allow a radio base station to transmit DCI using the enhanced PDCCH that is frequency-division multiplexed over the PDSCH is in progress. In this case, when the PUCCH resources for delivery acknowledgement information of the PDSCH, which is demodulated based on the DCI transmitted by the enhanced PDCCH (hereinafter referred to as "PUCCH resources corresponding to the enhanced PDCCH"), are determined based on above equation 1, these PUCCH resources collide with the PUCCH resources for delivery acknowledgement information of the PDSCH, which is demodulated based on DCI transmitted by the PDCCH (hereinafter referred to as "PUCCH resources corresponding to the PDCCH").

So, a study is in progress in which, by deciding PUCCH resources corresponding to the enhanced PDCCH based on the total number of CCEs allocated to the PDCCH, collisions between the PUCCH resources corresponding to the enhanced PDCCH and the PUCCH resources corresponding to the PDCCH are prevented.

FIG. 8 is a diagram to show PUCCH resources corresponding to the enhanced PDCCH and PUCCH resources corresponding to the PDCCH. As shown in FIG. 8, the PUCCH resources corresponding to the PDCCH are allocated to the radio resource regions at both ends of the system band based on above equation 1. As described above, since the total number of CCEs $N_{total\_CCE}$ allocated to the PDCCH is taken into account, the PUCCH resources corresponding to the enhanced PDCCH are allocated to consecutive radio resource regions to the PUCCH resources corresponding to the PDCCH. Consequently, it is possible to prevent collisions of PUCCH resources corresponding to the enhanced PDCCH and PUCCH resources corresponding to the PDCCH.

However, as has been described with reference to FIG. 6 and FIG. 7, when a plurality of enhanced PDCCH sets are configured for the user terminal UE, there is a problem that the PUCCH resources corresponding to the enhanced PDCCH collide between the plurality of enhanced PDCCH sets. So, the present inventors have studied a radio communication method by which, when a plurality of enhanced PDCCH sets are configured for the user terminal UE, collisions of PUCCH resources corresponding to the enhanced PDCCH between a plurality of enhanced PDCCH sets can be prevented and arrived at the present invention.

With the radio communication method according to the present embodiment, the radio base station configures a plurality of enhanced PDCCH sets (resource sets) for the user terminal UE. Also, to the user terminal UE, the radio base station transmits DCI to which different resource identifiers are added between a plurality of enhanced PDCCH sets. The user terminal UE determines the PUCCH resources to be used to transmit the PDSCH delivery acknowledgment information (ACK/NACK/DTX) (formats 1a/1b), based on the offset values that are associated with the resource identifiers. The user terminal UE transmits the above delivery acknowledgment information to the radio base station using the determined PUCCH resources.

Here, an ACK/NACK resource indicator (ARI) is arranged in DCI for resource identification. The resource identifier is not limited to the ARI, as long as it is information that can be dynamically reported, such as other information added to DCI or information included in DCI.

Also, each enhanced PDCCH set includes a plurality of enhanced control channel elements (eCCEs) that are allocated to the enhanced PDCCH. The eCCEs are radio resource units that are allocated to the enhanced PDCCH. The eCCEs may be formed with eREGs (enhanced Resource Element Groups) that are formed with a plurality of resource elements, or may be formed by dividing PRB pairs using at least one of frequency division, time division, and code division. Index numbers (hereinafter "eCCE index numbers") are assigned to the eCCEs, as will be described later.

A radio communication method according to the present embodiment will be described below.

FIG. 9 provides diagrams to show examples of eCCE index number assignment. In FIG. 9, enhanced PDCCH set #1, which is a primary set, and enhanced PDCCH set (set) #2 or #3, which is a secondary set, are configured for each user terminal UE. Note that FIG. 9 are simply examples, and a plurality of enhanced PDCCH sets may be configured in any way, as long as a plurality of enhanced PDCCH sets are configured for each user terminal UE.

Figure 9A:
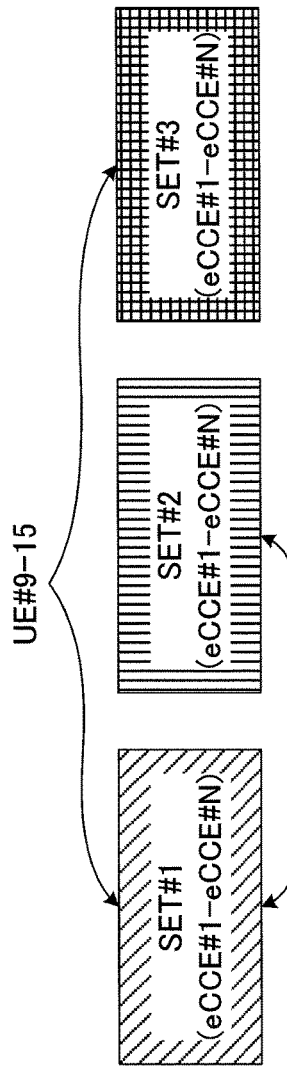
FIG. 9 provides diagrams to show examples of eCCE index number assignment.

In FIG. 9A, eCCE index numbers are assigned to eCCEs per enhanced PDCCH set. To be more specific, eCCE index numbers #1 to #N are assigned to the eCCEs forming each enhanced PDCCH set #1 to #3. In FIG. 9A, the same eCCE index numbers are used between enhanced PDCCH sets #1 to #3. Consequently, when determining PUCCH resources corresponding to the enhanced PDCCH based on the eCCE index numbers, cases might occur where the PUCCH resources collide between enhanced PDCCH sets #1 to #3.

Figure 9B:
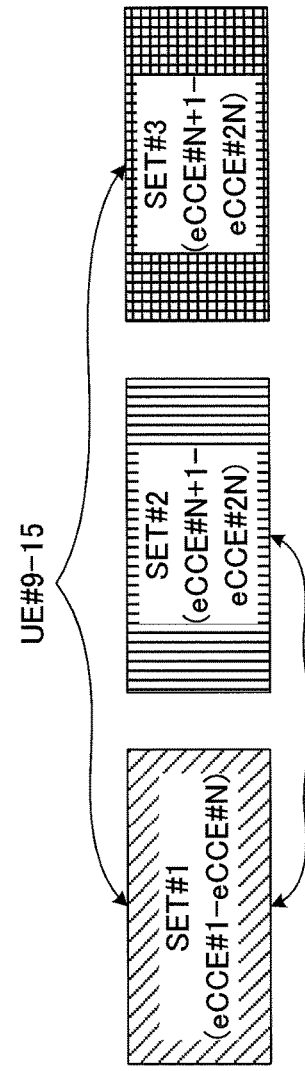

In FIG. 9B, eCCE index numbers are assigned consecutively to the eCCEs of a plurality of enhanced PDCCH sets, per user terminal UE. To be more specific, to the eCCEs included in enhanced PDCCH set #1, which is a primary set, eCCE index numbers #1 to #N are assigned. Also, to the eCCEs included in enhanced PDCCH set #2 or #3, which is a secondary set, eCCE index numbers #N+1 to #2N are assigned. In FIG. 9B, the same eCCE index numbers are used between enhanced PDCCH sets #2 and #3, which are secondary sets. Consequently, when determining PUCCH resources corresponding to the enhanced PDCCH based on the eCCE index numbers, cases might occur where the PUCCH resources collide between enhanced PDCCH sets #2 and #3.

Figure 9C:
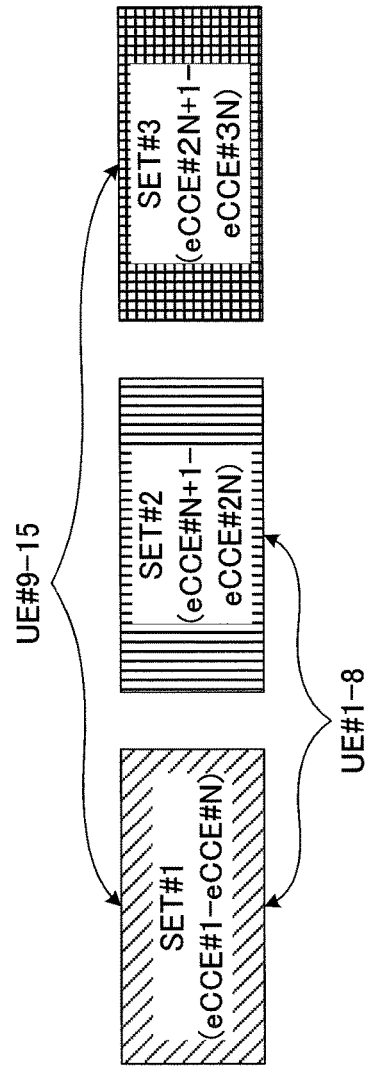

In FIG. 9C, eCCE index numbers are assigned consecutively to the eCCEs of all the enhanced PDCCH sets. To be more specific, eCCE index numbers #1 to #N are assigned to the eCCEs that are included in enhanced PDCCH set #1. Also, to the eCCEs included in enhanced PDCCH set #2, eCCE index numbers #N+1 to #2N, which are consecutive with the index numbers of enhanced PDCCH set #1, are assigned. Also, to the eCCEs included in enhanced PDCCH set #3, eCCE index numbers #2N+1 to #3N, which are consecutive with the index number of enhanced PDCCH set #2, are assigned. In FIG. 9C, the same eCCE index numbers are not used between enhanced PDCCH sets #1 to #3. Consequently, when determining PUCCH resources corresponding to the enhanced PDCCH based on the eCCE index numbers, it is possible to prevent collisions of the PUCCH resources between enhanced PDCCH sets #1 to #3.

In FIG. 9B and FIG. 9C, it is possible to reduce the possibility of PUCCH resource collisions between enhanced PDCCH sets #1 to #3, compared to the case shown in FIG. 9A. Meanwhile, in FIG. 9B and FIG. 9C, the overhead of PUCCH resources increases compared to the case shown in FIG. 9A. Consequently, from the perspective of improving the efficiency of use of radio resources, as shown in FIG. 9A, it is desirable to assign eCCE index numbers to eCCEs per enhanced PDCCH set.

So, with the radio communication method according to the present embodiment, the user terminal UE determines PUCCH resources corresponding to the enhanced PDCCH based on the offset values associated with ARIs (resource identifiers) added to DCI. By this means, it is possible to avoid collisions of PUCCH resources caused by overlapped eCCE index numbers between the enhanced PDCCH sets.

Figure 10:
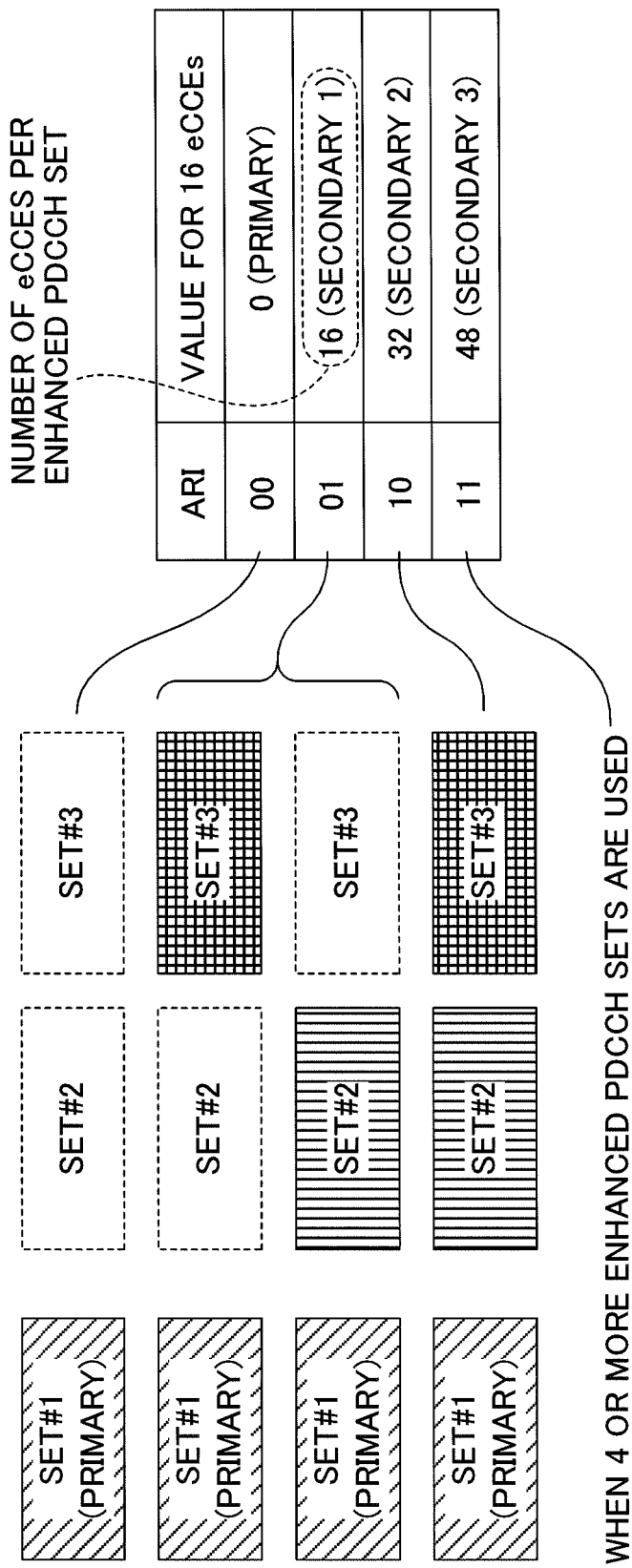
FIG. 10 is a diagram to show offset values associated with ARIs according to the present embodiment.

FIG. 10 is a diagram to explain offset values that are associated with ARIs (resource identifiers). As shown in FIG. 10, ARIs are associated with the offset values of the PUCCH resources between the enhanced PDCCH sets (sets). These offset values are configured based on the number of eCCEs per enhanced PDCCH set.

For example, as shown in FIG. 10, when the number of eCCEs per enhanced PDCCH set is sixteen, the ARI value "00" is associated with the offset value "0." Also, the ARI value "01" is associated with the offset value "16," which is equal to the number of eCCEs per enhanced PDCCH set. Similarly, also, the ARI value "10" is associated with the offset value "32" and the ARI value "11" is associated with the offset value "48," which are equal to multiples of the number of eCCEs per enhanced PDCCH set. In this way, by configuring the offset values based on the number of eCCEs per enhanced PDCCH set, it is possible to avoid collisions of PUCCH resources caused by overlapped eCCE index numbers between enhanced PDCCH sets more reliably.

Also, in FIG. 10, the offset value for the primary set is configured to be "0 (zero)," and the offset values for the secondary sets are configured to be multiples of the number of eCCEs per enhanced PDCCH set. As shown in FIG. 7, the primary set is an enhanced PDCCH set that is configured for all the user terminals UE in common. Also, the secondary sets are enhanced PDCCH sets that are configured for at least one user terminal UE separately. In this way, by configuring the offset value of the frequently-used primary set to "0," it is possible to allocate PUCCH resources without producing free uplink radio resources.

Note that associations between ARIs and offset values are not limited to the cases shown in FIG. 10. For example, although a primary set and secondary sets are shown in FIG. 10, these are by no means limiting, as long as a plurality of enhanced PDCCH sets are configured.

Here, a method of adding ARIs (resource identifiers) to DCI in the radio base station will be described in detail with reference to FIG. 10. When enhanced PDCCH set (set) #1 alone is configured for the user terminal UE, the radio base station adds the ARI "00," which is associated with the offset value "0" for the primary set, to the DCI to be transmitted by enhanced PDCCH set #1.

Also, when enhanced PDCCH sets (sets) #1 and #3 are configured for the user terminal UE, the radio base station adds the ARI "00," which is associated with the offset value "0" for the primary set, to the DCI to be transmitted by enhanced PDCCH set #1, and adds the ARI "01," which is associated with the offset value "16" for the first secondary set, to the DCI to be transmitted by enhanced PDCCH set #3. By this means, while preventing collisions of PUCCH resources between enhanced PDCCH sets #1 and #3, it is possible to arrange these PUCCH resources in consecutive radio resource regions.

Also, when enhanced PDCCH sets (sets) #1 and #2 are configured for the user terminal UE, the radio base station adds the ARI "00," which is associated with the offset value "0" for the primary set, to the DCI to be transmitted by enhanced PDCCH set #1, and adds the ARI "01," which is associated with the offset value "16" for the first secondary set, to the DCI to be transmitted by enhanced PDCCH set #2. By this means, while preventing collisions of PUCCH resources between enhanced PDCCH sets #1 and #2, it is possible to arrange these PUCCH resources in consecutive radio resource regions.

Also, when enhanced PDCCH sets (sets) #1, #2 and #3 are configured for the user terminal UE, the radio base station adds the ARI "00," which is associated with the offset value "0" for the primary set, to the DCI to be transmitted by enhanced PDCCH set #1, and adds the ARI "01" associated with the offset value "16" for the first secondary set and the ARI "10" associated with the offset value "32" for the second secondary set respectively to the DCI to be transmitted by enhanced PDCCH sets #2 and #3. By this means, while preventing collisions of PUCCH resources between enhanced PDCCH sets #1 to #3, it is possible to arrange these PUCCH resources in consecutive radio resource regions.

Also, when four or more enhanced PDCCH sets are configured for the user terminal UE, the radio base station adds the ARI "11," which is associated with the offset value "48" for the third secondary set, to the DCI to be transmitted by the fourth enhanced PDCCH set onward. This is because, as long as eCCEs of overlapped eCCE index numbers are not used between enhanced PDCCH sets of the ARI "11," collisions of PUCCH resources do not happen, even when the same offset value is used.

As described above, with the radio communication method according to the present embodiment, different ARIs (resource identifies) are applied to DCI between a plurality of enhanced PDCCH sets configured for the user terminal UE. The user terminal UE decides the PUCCH resources corresponding to the enhanced PDCCH based on the offset values associated with these ARIs. To be more specific, the user terminal UE determines the PUCCH resources corresponding to the enhanced PDCCH using equation 2.

[Formula 4]

$$n_{PUCCH}^{(1,\tilde{p}0)} = n_{eCCE} + N_{PUCCH}^{(1)} + N_{total\_CCE} + ARI \quad \text{(Equation 2)}$$

where:

[Formula 5]

$$n_{PUCCH}^{(1,\tilde{p}0)}$$

is PUCCH resources to transmit the above delivery acknowledgement information by an antenna port $p_0$. Also, $n_{eCCE}$ is the minimum eCCE index number where DCI is mapped. This minimum CCE index number is detected by blind-decoding the search spaces of each enhanced PDCCH set in the user terminal UE. Also,

[Formula 6]

$$N_{PUCCH}^{(1)}$$

is a parameter reported to the user terminal UE through higher layer signaling.

Also, when the PDCCH is placed over maximum three OFDM symbols from the top of a subframe, $N_{total\_CCE}$ is the total number of CCEs that are allocated to this PDCCH. This total number of CCEs may be calculated based on the top OFDM symbol of the enhanced PDCCH to be reported to the user terminal through higher layer signaling. In this case, the total number of CCEs may be combined with the above parameter,

[Formula 7]

$$N_{PUCCH}^{(1)}$$

and reported as one value. Alternatively, the total number of CCEs may be calculated based on a CFI (Control Format Indicator) to be transmitted by a physical control format indicator channel (PCFICH). The CFI represents the number of OFDM symbols forming the PDCCH. Also, the ARI is the offset value associated with ARIs (resource identifiers) added to DCI.

Note that, in the radio communication method according to the present embodiment, PUCCH resources corresponding to the enhanced PDCCH may be determined apart from above equation 2. To be more specific, in above equation 2, antenna ports, parameters reported from higher layers, and the total number of eCCEs may be omitted.

For example, the user terminal UE may determine PUCCH resources corresponding to the enhanced PDCCH based on the offset values associated with ARIs and the eCCE index number of eCCEs where DCI is mapped. When a carrier (also referred to as an "additional carrier," a "new type carrier," a "capacity carrier" and so on) where the PDCCH is not placed over maximum three OFDM symbols from the subframe top is used, the PUCCH resources corresponding to the enhanced PDCCH and the PUCCH resources corresponding to the PDCCH do not collide. Consequently, if the offset values associated with ARIs and the eCCE index numbers are taken into account, it is possible to prevent collisions between enhanced PDCCH sets and adequately determine PUCCH resources.

Figure 11:
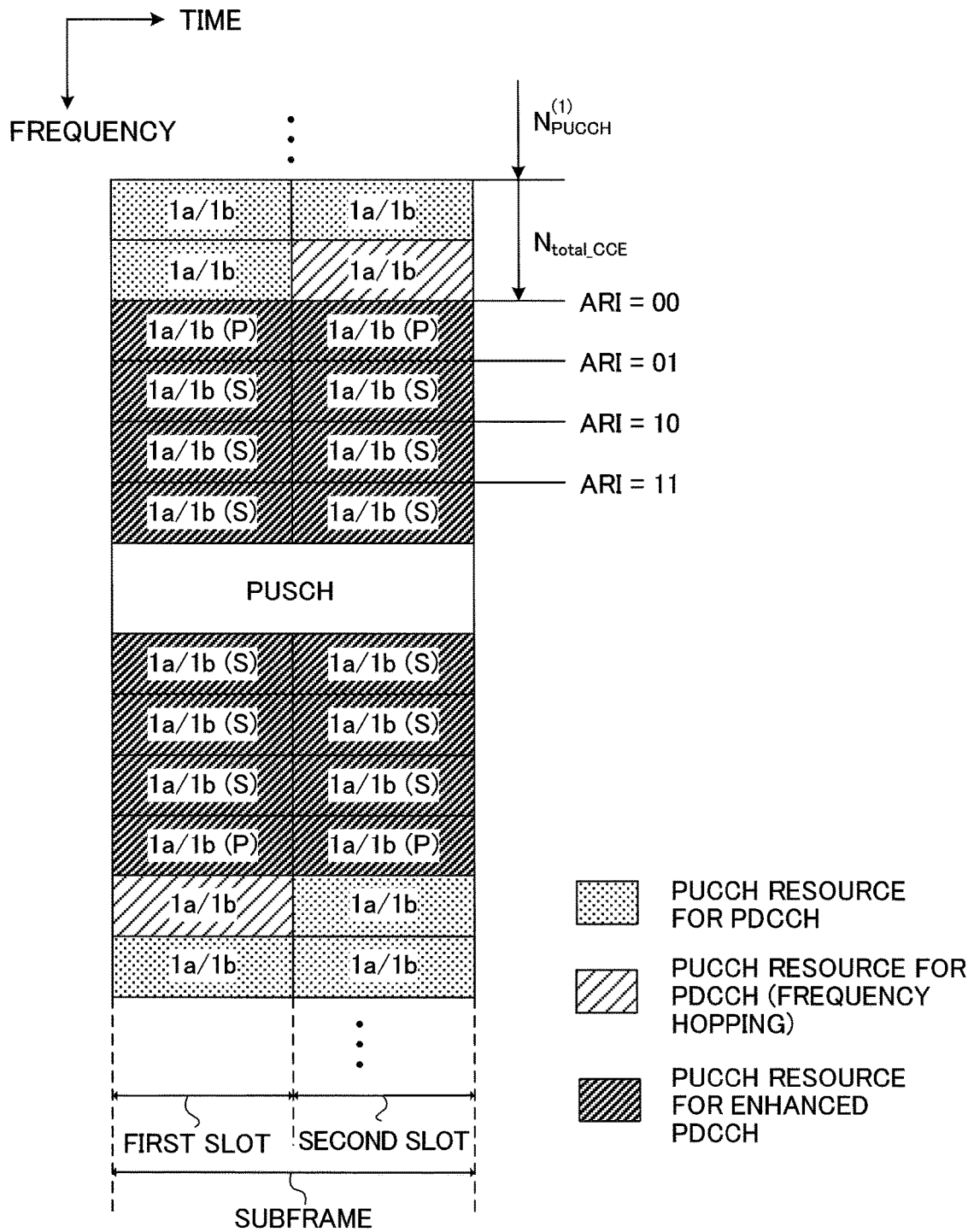
FIG. 11 is a diagram to show an example of PUCCH resource allocation according to the present embodiment.

Next, an example of PUCCH resource allocation according to the radio communication method of the present embodiment will be described in detail with reference to FIG. 11. In FIG. 11, PUCCH resources corresponding to the PDCCH, PUCCH resources corresponding to the primary set of the enhanced PDCCH and PUCCH resources corresponding to first to third secondary sets respectively, are shown.

For example, the PUCCH resources corresponding to the PDCCH are determined as shown in equation 3.

[Formula 8]

$$n_{PUCCH}^{(1,\tilde{p}0)} = n_{CCE} + N_{PUCCH}^{(1)} \quad \text{(Equation 3)}$$

As described above,

[Formula 9]

$$n_{PUCCH}^{(1,\tilde{p}0)}$$

is the PUCCH resources to transmit the above delivery acknowledgment information by the antenna port $p_0$. $n_{CCE}$ is the minimum CCE index number where DCI is mapped. Also,

[Formula 10]

$$N_{PUCCH}^{(1)}$$

is a parameter reported to the user terminal UE through higher layer signaling.

With equation 3, the PUCCH resources corresponding to the PDCCH are determined from the PRBs at both ends of the uplink system bandwidth. Note that, as shown in FIG. 11, PUCCH resources are arranged in the PRBs of one edge of the system band in the first slot, and arranged in the PRBs of the other edge of the system band in the second slot. In this way, by subjecting the PUCCH resources to frequency hopping, it is possible to achieve a frequency diversity effect of delivery acknowledgement information.

Also, the PUCCH corresponding to the enhanced PDCCH of the primary set is determined as shown in equation 4.

[Formula 11]

$$\begin{aligned}n_{PUCCH}^{(1,\tilde{p}_0)} &= n_{eCCE} + \overline{N}_{PUCCH}^{(1)} \\ &= n_{eCCE} + N_{PUCCH}^{(1)} + N_{total\_CCE}\end{aligned} \quad \text{(Equation 4)}$$

As described above, $n_{eCCE}$ is the minimum eCCE index number where DCI is mapped. $N_{total\_CCE}$ is the total number of CCEs forming the PDCCH. Note that the explanation of the meaning of the variables same as in equation 3 will be omitted.

With equation 4, the total number of CCEs $N_{total\_CCE}$ is taken into account, so that it is possible to determine continuous PRBs without making PUCCH resources, which serve as PUCCH resources corresponding to the primary set, collide with PUCCH resources corresponding to the PDCCH, as shown in FIG. 11. Also, the ARI "00" is added to the DCI to be transmitted by the primary set, and the offset value "0" for the primary set is associated with this ARI "00" (FIG. 10). Since the offset value is "0," the PUCCH resources corresponding to the primary set follows the PUCCH resources corresponding to the PDCCH. Note that although the offset value ARI is not written in equation 4, it is also possible to add the offset value "0."

Also, the PUCCH corresponding to the secondary set of the enhanced PDCCH is determined as shown in equation 5.

[Formula 12]

$$\begin{aligned}n_{PUCCH}^{(1,\tilde{p}_0)} &= n_{eCCE} + \overline{N}_{PUCCH}^{(1)} \\ &= n_{eCCE} + N_{PUCCH}^{(1)} + N_{total\_CCE} + ARI\end{aligned} \quad \text{(Equation 5)}$$

As described above, the ARI is the offset value associated with ARIs (resource identifiers) added to DCI. Note that the explanation of the meaning of the variables same as in equations 3 and 4 will be omitted.

With equation 5, the offset values associated with ARIs added to DCI are taken into account, so that it is possible to determine continuous PRBs without making PUCCH resources, which serve as PUCCH resources corresponding to the first secondary set, collide with PUCCH resources corresponding to the primary set, as shown in FIG. 11. Also, different ARIs are added to the DCI to be transmitted by the second and third secondary sets, so that it is possible to prevent collisions between PUCCH resources.

Now, a radio communication system according to the present embodiment will be described in detail.

(Configuration of a Radio Communication System)

Figure 12:
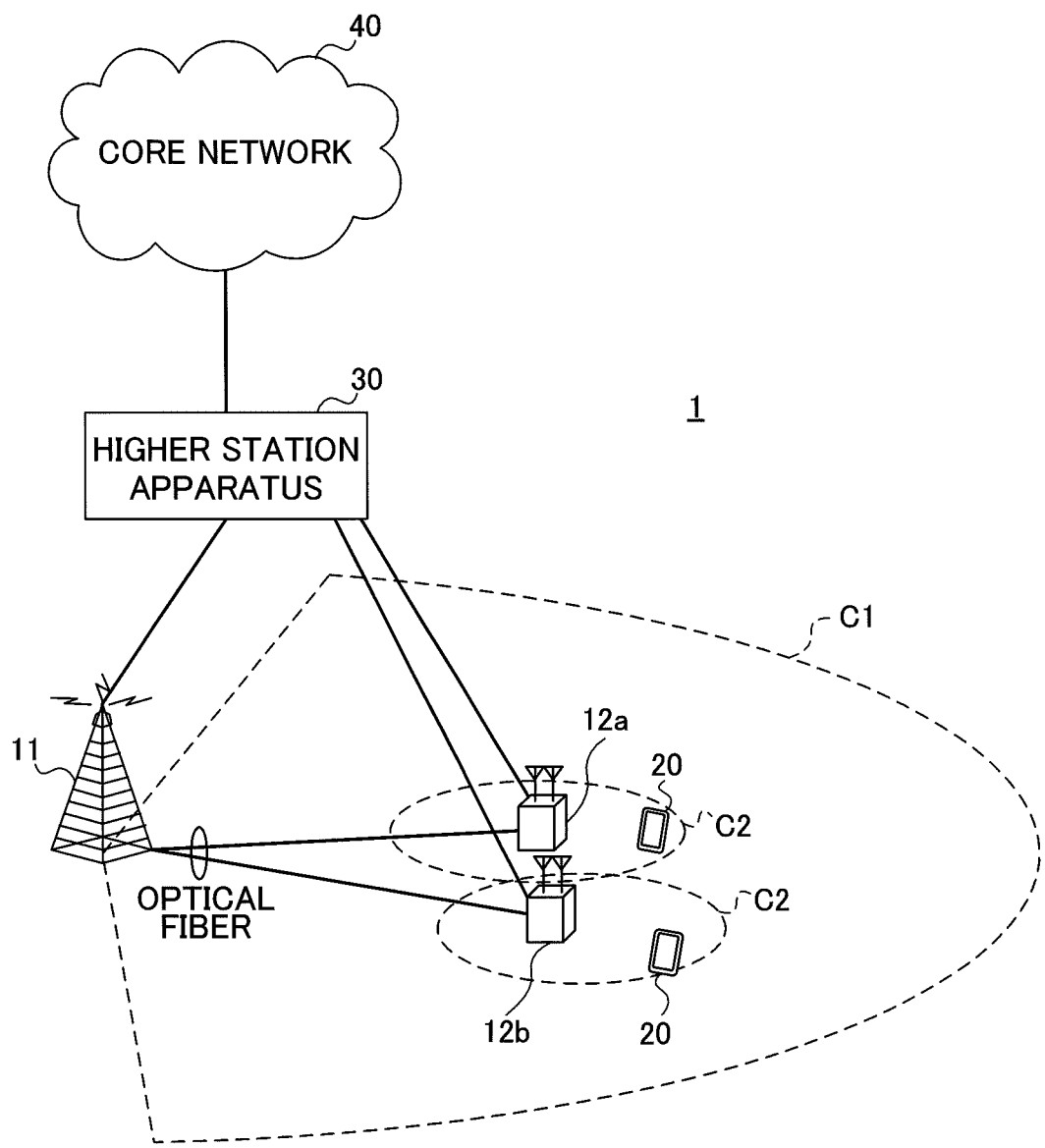
FIG. 12 is a diagram to explain a system structure of a radio communication system according to the present embodiment.

FIG. 12 is a schematic configuration diagram of a radio communication system according to the present embodiment. Note that the radio communication system shown in FIG. 12 is a system to accommodate, for example, the LTE system or SUPER 3G. This radio communication system adopts carrier aggregation to group a plurality of fundamental frequency blocks (component carriers) into one, where the system band of the LTE system constitutes one unit. Also, this radio communication system may be referred to as "IMT-Advanced," or may be referred to as "4G," or "FRA (Future Radio Access)."

As shown in FIG. 12, a radio communication system 1 includes a radio base station 11 that forms a macro cell C1, and radio base stations 12a and 12b that form small cells C2, which are placed inside the macro cell C1 and narrower than the macro cell C1. Also, in the macro cell C1 and in each small cell C2, user terminals 20 are placed. The user terminals 20 are configured to be able to perform radio communication with both the radio base station 11 and the radio base stations 12.

Between the user terminals 20 and the radio base station 11, communication is carried out using a carrier of a relatively low frequency band (for example, 2 GHz) and a wide bandwidth (referred to as, for example, "existing carrier," "legacy carrier" and so on). Meanwhile, between the user terminals 20 and the radio base stations 12, a carrier of a relatively high frequency band (for example, 3.5 GHz and so on) and a narrow bandwidth may be used, or the same carrier to be used between the user terminals 20 and the radio base station 11 may be used. The radio base station 11 and each radio base station 12 are connected by wire connection or by wireless connection.

The radio base station 11 and each radio base station 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "radio base station apparatus," a "transmission point" and so on. Also, the radio base stations 12 are radio base stations having local coverages, and may be referred to as "pico base stations," "femto base stations," "Home eNodeBs," "RRHs (Remote Radio Heads)," "micro base stations," "transmission points" and so on. Also, when no distinction is made between the radio base stations 11 and 12, these will be both referred to as "radio base station 10." Each user terminal 20 is a terminal that supports various communication schemes such as LTE, LTE-A and so on, and may be both a mobile communication terminal and a fixed communication terminal.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Here, communication channels to be used in the radio communication system shown in FIG. 12 will be described. Downlink communication channels include a PDSCH (Physical Downlink Shared Channel), which is used by each user terminal 20 on a shared basis, and downlink L1/L2 control channels (PDCCH, PCFICH and PHICH). User data and higher control information are transmitted by the PDSCH. Scheduling information and so on for the PDSCH and the PUSCH is transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel). Also, the scheduling information and so on for the PDSCH and the PUSCH may be transmitted by the enhanced PDCCH (referred to as, for example, an "Enhanced Physical Downlink Control Channel," an "ePDCCH," an "E-PDCCH," an "FDM-type PDCCH" and so on). This enhanced PDCCH (enhanced downlink control channel) is frequency-division-multiplexed with the PDSCH (downlink shared data channel), and used to cover the shortage of the capacity of the PDCCH.

Uplink control channels include the PUSCH (Physical Uplink Shared Channel), which is used by each user terminal 20 on a shared basis as an uplink data channel, and the PUCCH (Physical Uplink Control Channel), which is an uplink control channel. User data and higher control information are transmitted by this PUSCH. Also, downlink radio quality information (CQI: Channel Quality Indicator), ACK/NACK and so on are transmitted by the PUCCH.

Figure 13:
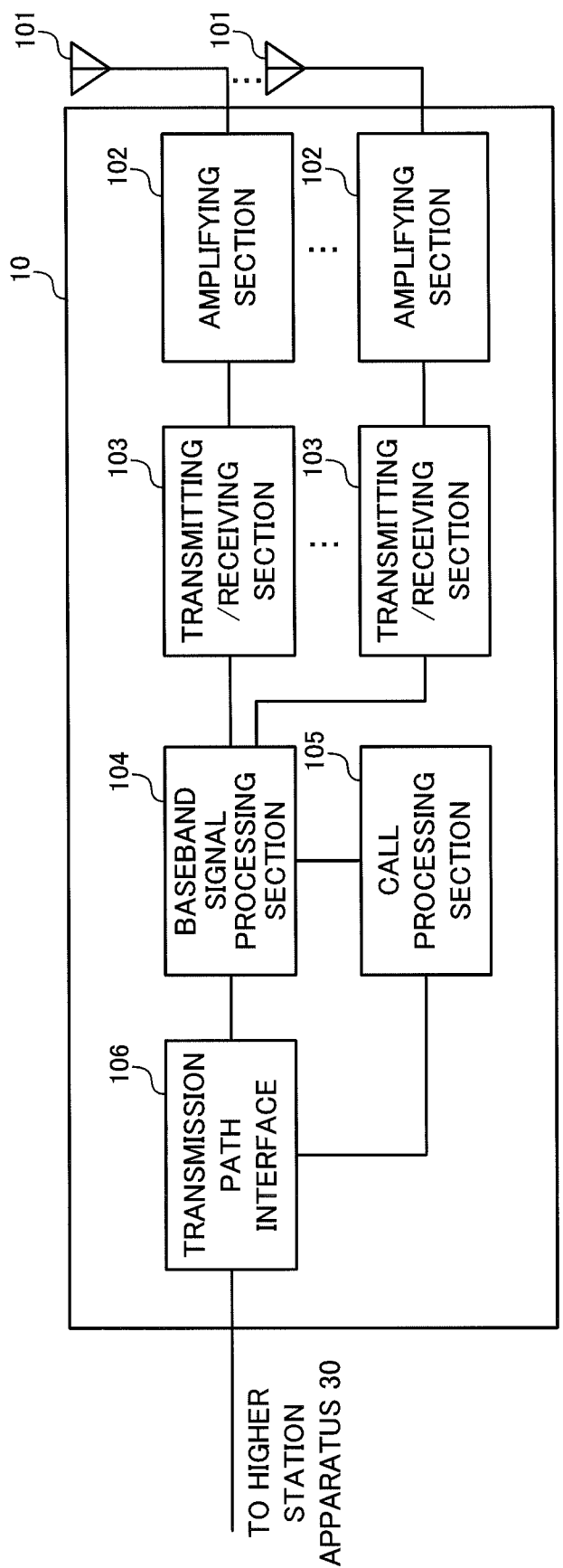
FIG. 13 is a diagram to explain an overall structure of a radio base station according to the present embodiment.

FIG. 13 is a diagram to show an overall structure of a radio base station 10 (which covers the radio base stations 11 and 12) according to the present embodiment. The radio base station 10 includes a plurality of transmitting/receiving antennas 101 for MIMO transmission, amplifying sections 102, transmitting/receiving sections (transmitting sections) 103, a baseband signal processing section 104, a call processing section 105 and a transmission path interface 106.

User data to be transmitted from the radio base station 10 to the user terminal 20 on the downlink is input from the higher station apparatus 30, into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process are carried out, and the result is transmitted to each transmitting/receiving section 103. Furthermore, downlink control channel signals are also subjected to transmission processes such as channel coding and an inverse fast Fourier transform, and are transferred to each transmitting/receiving section 103.

Also, the baseband signal processing section 104 reports, to the user terminal 20, control information for allowing communication in the cell, through a broadcast channel. The information for allowing communication in the cell includes, for example, the uplink or downlink system bandwidth and so on.

Each transmitting/receiving section 103 converts the baseband signals, which have been subjected to precoding and output from the baseband signal processing section 104 on a per antenna basis, into a radio frequency band. The amplifying sections 102 amplify the radio frequency signals subjected to frequency conversion, and transmit the results through the transmitting/receiving antennas 101.

On the other hand, as for data that is transmitted from the user terminal 20 to the radio base station 10 on the uplink, the radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data included in the input baseband signals is subjected to an FFT process, an IDFT process, error correction decoding, a MAC retransmission control receiving process, and RLC layer and PDCP layer receiving processes, and the result is transferred to the higher station apparatus 30 via the transmission path interface 106. The call processing section 105 performs call processing such as setting up and releasing communication channels, manages the state of the radio base station 10 and manages the radio resources.

Figure 14:
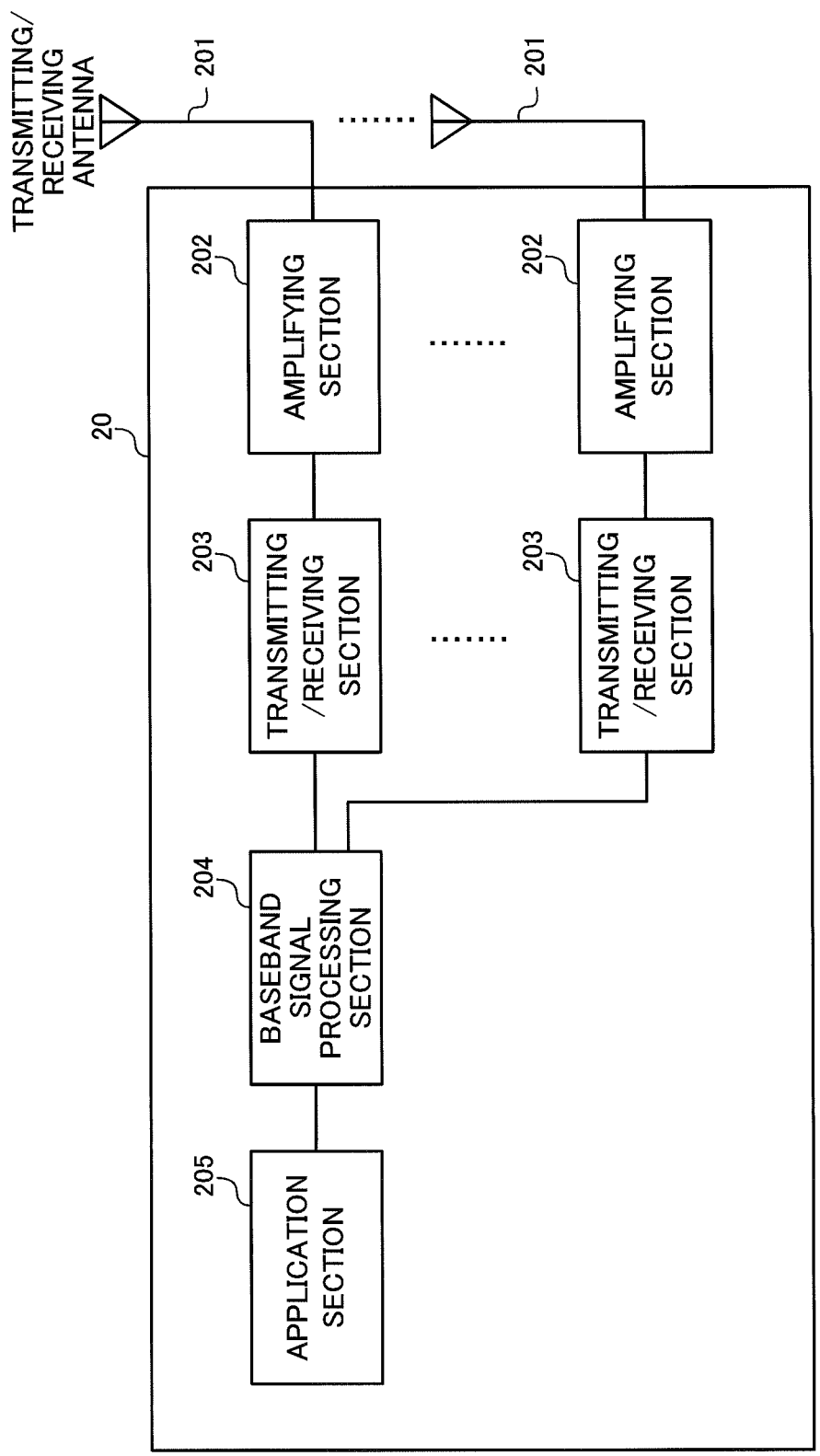
FIG. 14 is a diagram to explain an overall structure of a user terminal according to the present embodiment.

FIG. 14 is a diagram to show an overall structure of a user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204, and an application section 205.

As for downlink data, radio frequency signals that are received in the plurality of transmitting/receiving antennas 201 are each amplified in the amplifying sections 202, subjected to frequency conversion and converted into baseband signals in the transmitting/receiving sections 203. These baseband signals are subjected to receiving processes such as an FFT process, error correction decoding and retransmission control, in the baseband signal processing section 204. In this downlink data, downlink user data is transferred to the application section 205. The application section 205 performs processes related to higher layers above the physical layer and the MAC layer. Also, in the downlink data, broadcast information is also transferred to the application section 205.

Meanwhile, uplink user data is input from the application section 205 to the baseband signal processing section 204. The baseband signal processing section 204 performs a retransmission control (H-ARQ (Hybrid ARQ)) transmission process, channel coding, precoding, a DFT process, an IFFT process and so on, and the result is transferred to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the result by the transmitting/receiving antennas 201.

Figure 15:
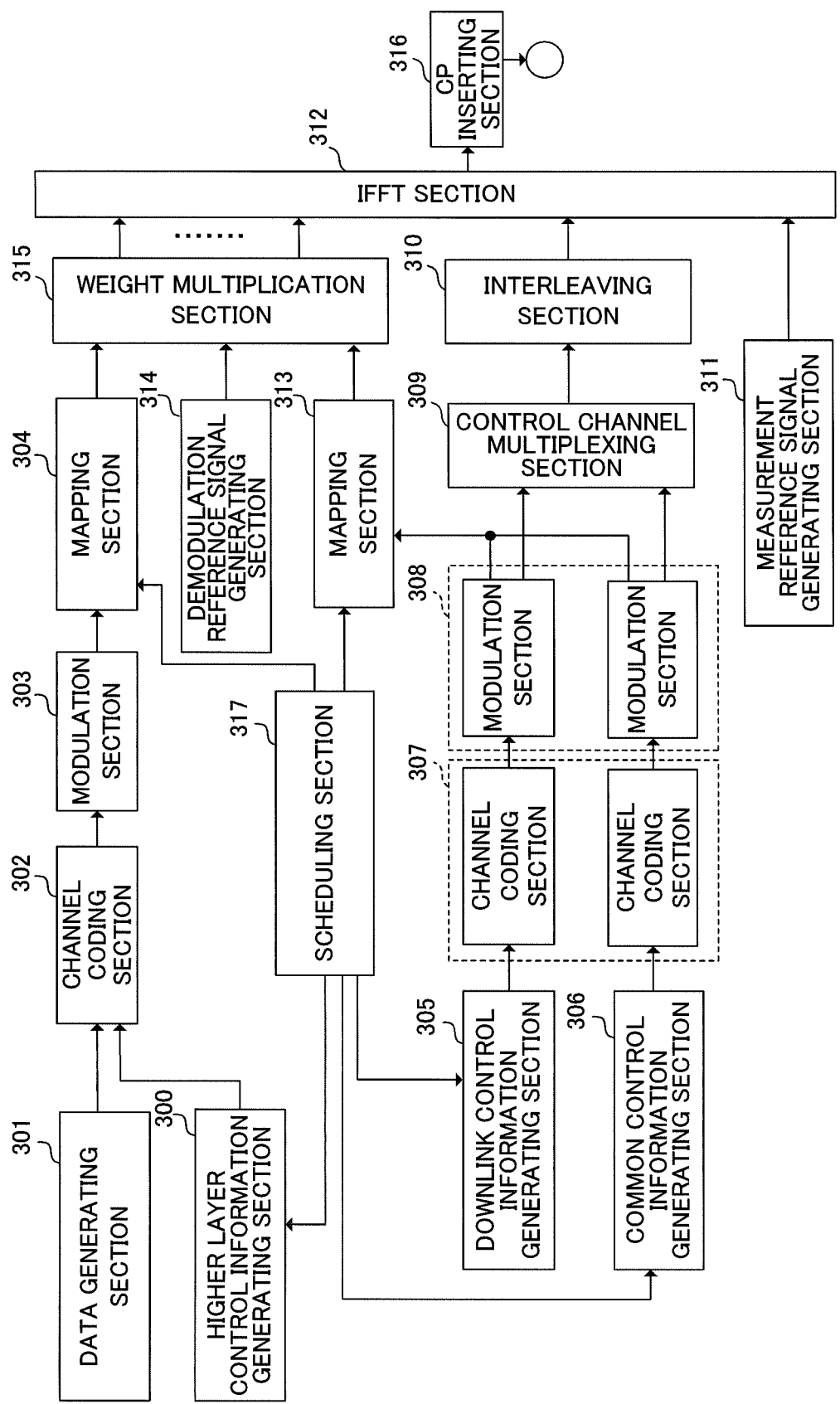
FIG. 15 is a functional configuration diagram of a baseband processing section and part of higher layers of a radio base station according to the present embodiment.

FIG. 15 is a functional configuration diagram of the baseband signal processing section 104 provided in the radio base station 10 according to the present embodiment, and part of higher layers. Note that, although FIG. 15 primarily shows downlink (transmitting) functional configurations, the radio base station 10 may have uplink (receiving) functional configurations as well.

As shown in FIG. 15, the radio base station 10 has a higher layer control information generating section 300, a data generating section 301, a channel coding section 302, a modulation section 303, a mapping section 304, a downlink control information generating section 305, a common control information generating section 306, channel coding sections 307, modulation sections 308, a control channel multiplexing section 309, an interleaving section 310, a measurement reference signal generating section 311, an IFFT section 312, a mapping section 313, a demodulation reference signal generating section 314, a weight multiplication section 315, a CP inserting section 316, and a scheduling section 317. Note that, when the radio base station 10 is a radio base station 12 to form a small cell C2, the control channel multiplexing section 309 and the interleaving section 310 may be omitted.

The higher layer control information generating section 300 generates higher layer control information on a per user terminal 20 basis. Also, the higher layer control information is control information that is sent through higher layer signaling (for example, RRC signaling), and includes, for example, enhanced PDCCH set allocation information (to be described later) or parameters for PUCCH resources. The data generating section 301 generates downlink user data per user terminal 20.

The downlink user data that is generated in the data generating section 301 and the higher layer control information that is generated in the higher layer control information generating section 300 are input in the channel coding section 302 as downlink data to be transmitted in the PDSCH. The channel coding section 302 performs channel coding of the downlink data for each user terminal 20 in accordance with the coding rate determined based on feedback information from each user terminal 20. The modulation section 303 modulates the downlink data having been subjected to channel coding, in accordance with the modulation scheme determined based on feedback information from each user terminal 20. The mapping section 304 maps the modulated downlink data in accordance with commands from the scheduling section 317.

The downlink control information generating section 305 generates UE-specific downlink control information on a per user terminal 20 basis. The UE-specific downlink control information includes PDSCH allocation information (DL grants, DCI formats 1A and 1C and so on), and PUSCH allocation information (UL grants, DCI formats 0 and 4 and so on). The common control information generating section 306 generates common (cell-specific) control information that is common between cells. The cell-specific control information includes, for example, control information for DCI formats 1A and 1, and so on.

The downlink control information generated in the downlink control information generating section 305 and the common control information generated in the common control information generating section 306 are input in the channel coding sections 307 as downlink control information to be transmitted in the PDCCH or the enhanced PDCCH. The channel coding sections 307 perform channel coding of the downlink control information received as input, in accordance with the coding rate designated by the scheduling section 317, which will be described later. The modulation sections 308 modulate the downlink control information having been subjected to channel coding, in accordance with the modulation scheme designated by the scheduling section 317.

Here, the downlink control information to be transmitted in the PDCCH is input from the modulation sections 308 into the control channel multiplexing section 309 and multiplexed. The downlink control information multiplexed in the control channel multiplexing section 309 is interleaved in the interleaving section 310. The interleaved downlink control information is input in the IFFT section 312 with measurement reference signals (CSI-RS: Channel State Information-Reference Signal, CRS: Cell-specific Reference Signal and so on) generated in the measurement reference signal section 311.

Meanwhile, downlink control information that is transmitted in the enhanced PDCCH is input from the modulation sections 308 into the mapping section 313. The mapping section 313 maps the downlink control information in predetermined allocation units (for example, in eCCE units or in eREG units) in accordance with commands from the scheduling section 317, which will be described later. The mapping section 313 may map the downlink control information using distributed mapping in accordance with commands from the scheduling section 317, or may map the downlink control information using localized mapping.

The mapped downlink control information is input in the weight multiplication section 315 with the downlink data to be transmitted in the PDSCH (that is, the downlink data mapped in the mapping section 304) and the demodulation reference signals (DM-RSs) generated in the demodulation reference signal generating section 314. The weight multiplication section 315 multiplies the downlink data to be transmitted by the PDCSH, the downlink control information to be transmitted by the enhanced PDCCH and the demodulation reference signals, by user terminal 20-specific precoding weights, and performs precoding. The transmission data having been subjected to precoding is input into the IFFT section 312, and converted from frequency domain signals into time sequence signals through an inverse fast Fourier transform. Cyclic prefixes (CPs) to function as guard intervals are inserted in the output signals from the IFFT section 312 by the CP inserting section 316, and the signals are output to the transmitting/receiving sections 103.

The scheduling section 317 schedules the downlink data to be transmitted by the PDSCH, the downlink control information to be transmitted by the enhanced PDCCH and the downlink control information to be transmitted by the PDCCH. To be more specific, the scheduling section 317 allocates radio resources based on command information from the higher station apparatus 30 and feedback information (for example, CSI (Channel State Information) including CQIs (Channel Quality Indicators) and RIs (Rank Indicators)) from each user terminal 20.

With the present embodiment, the scheduling section 317 configures a plurality of enhanced PDCCH sets (resource sets) for each user terminal 20. Each enhanced PDCCH set includes a plurality of enhanced control channel elements (eCCEs) that are allocated to the enhanced PDCCH, and is formed with a plurality of PRB pairs. Note that a plurality of enhanced PDCCH sets may include a primary set, which is allocated to all of the user terminals 20 in common, and a secondary set, which is allocated to at least one user terminal 20 separately. The configuration section of the present invention is formed with the scheduling section 317.

Note that allocation information of a plurality of enhanced PDCCH sets is reported to the user terminal 20 using at least one of higher layer signaling such as RRC signaling or a broadcast channel (PBCH: Physical Broadcast Channel). This enhanced PDCCH allocation information may be, for example, an index number of PRB pairs, an eCCE index number of eCCEs that form the enhanced PDCCH set and so on.

Also, according to the present embodiment, the downlink control information generating section 305 generates downlink control information to which different ARIs (resource identifiers) are added between a plurality of enhanced PDCCH sets allocated to the user terminal 20. As described in FIG. 10, the ARIs are associated with PUCCH resource offset values to transmit delivery acknowledgment information (ACK/NACK/DTX) of the PUSCH demodulated based on the downlink control information to which the ARIs have been added.

Figure 16:
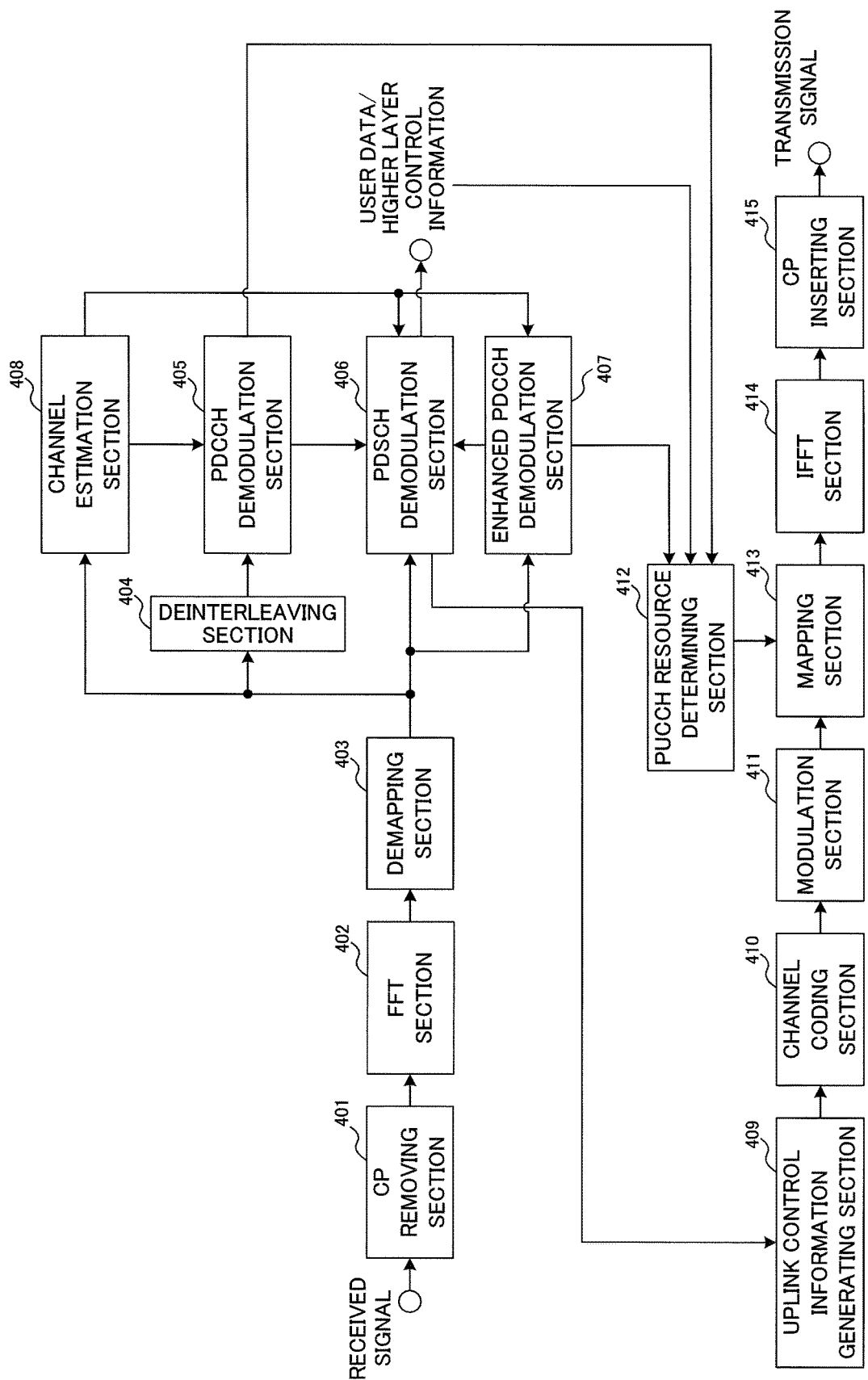
FIG. 16 is a functional configuration diagram of a baseband processing section of a user terminal according to an embodiment.

FIG. 16 is a functional configuration diagram of the baseband signal processing section 204 provided in the user terminal 20. The user terminal 20 has a CP removing section 401, an FFT section 402, a demapping section 403, a deinterleaving section 404, a PDCCH demodulation section 405, a PDSCH demodulation section 406, an enhanced PDCCH demodulation section 407 and a channel estimation section 408, as downlink (receiving) functional configurations.

Downlink signals received from the radio base station 10 as received data have the cyclic prefixes (CPs) removed in the CP removing section 401. The downlink signals, from which the CPs have been removed, are input in the FFT section 402. The FFT section 402 performs a fast Fourier transform (FFT) on the downlink signals, converts time domain signals into frequency domain signals, and inputs these signals in the demapping section 403. The demapping section 403 demaps the downlink signals. Note that the demapping process by the demapping section 403 is performed based on higher layer control information that is received as input from the application section 205. Downlink control information that is output from the demapping section 403 is deinterleaved in the deinterleaving section 404.

The PDCCH demodulation section 405 performs blind decoding, demodulation, channel decoding and so on of the downlink control information (DCI) output from the deinterleaving section 404, based on the result of channel estimation in the channel estimation section 408, which will be described later. To be more specific, the PDCCH demodulation section 405 blind-decodes the candidate search spaces reported from the radio base station 10 in advance or the candidate search spaces determined in advance, and acquires downlink control information. For example, the PDCCH demodulation section 405 blind-decodes the candidate common search spaces reported by the broadcast channel, and acquires common control information. Also, the PDCCH demodulation section 405 blind-decodes the candidate UE-specific search spaces that are reported as higher layer control information, and acquires UE-specific downlink control information.

Also, with the present embodiment, by blind decoding, the PDCCH demodulation section 405 detects the minimum CCE index number to which downlink control information is mapped. The PDCCH demodulation section 405 outputs the detected minimum CCE index number to a PUCCH resource determining section 412.

The PDSCH demodulation section 406 performs demodulation and channel decoding and so on of the downlink data output from the demapping section 403, based on the result of channel estimation in the channel estimation section 408, which will be described later. To be more specific, the PDSCH demodulation section 406 demodulates the PDSCH that is allocated to the subject terminal based on the downlink control information (for example, downlink scheduling information such as DL grants) demodulated in the PDCCH demodulation section 405 or the enhanced PDCCH demodulation section 407, and acquires downlink data (downlink user data and higher layer control information) for the subject terminal.

The enhanced PDCCH demodulation section 407 performs blind decoding, demodulation and channel decoding and so on of the enhanced PDCCH demodulation section 407 output from the demapping section 403, based on the result of channel estimation in the channel estimation section 408, which will be described later. To be more specific, the enhanced PDCCH demodulation section 407 blind-decodes candidate search spaces configured by specifications or candidate search spaces reported in advance from the radio base station 10, and acquires downlink control information. For example, the enhanced PDCCH demodulation section 407 blind-decodes the candidate common search spaces reported through the broadcast channel, and acquires common control information. Also, the enhanced PDCCH demodulation section 407 blind-decodes the candidate UE-specific search spaces reported as higher layer control information, and acquires UE-specific downlink control information.

Also, with the present embodiment, by blind decoding, the enhanced PDCCH demodulation section 407 detects the minimum eCCE index number of eCCEs where downlink control information is mapped. The enhanced PDCCH demodulation section 407 outputs the detected minimum eCCE index number to the PUCCH resource determining section 412.

The channel estimation section 408 performs channel estimation using the demodulation reference signals (DM-RSs), the measurement reference signals (CRSs and CSI-RSs) and so on. The channel estimation section 408 outputs the result of channel estimation by the measurement reference signals (CRSs and CSI-RSs) to the PDCCH demodulation section 405. Meanwhile, the channel estimation section 408 outputs the result of channel estimation by the demodulation reference signals (DM-RSs) to the PDSCH demodulation section 406 and the enhanced PDCCH demodulation section 407. By means of this demodulation using user terminal 20-specific demodulation reference signals (DM-RSs), it is possible to achieve beam-forming gain with respect to the PDSCH and the enhanced PDCCH.

The user terminal 20 has an uplink control information generating section 409, a channel coding section 410, a modulation section 411, a PUCCH resource determining section 412, a mapping section 413, an IFFT section 414, and a CP inserting section 415 as uplink (transmitting) functional configurations.

The uplink control information generating section 409 generates uplink control information (UCI). The uplink control information includes delivery confirmation information (ACK/NACK/DTX) of the PDSCH that is demodulated in the PDSCH demodulation section 406 (PUCCH formats 1a/1b). Also, in the uplink control information, a channel quality indicator (CQI) (PUCCH formats 2a/2b), scheduling request (PUCCH format 1), control information for carrier aggregation (PUCCH format 3) and so on may be included as well. The generated uplink control information is channel-coded in the channel coding section 410, and modulated in the modulation section 411.

The PUCCH resource determining section 412 decides the PUCCH resources to use to transmit the uplink control information generated in the uplink control information generating section 409. To be more specific, the PUCCH resource determining section 412 determines the PUCCH resources to use to transmit delivery acknowledgment information in accordance with, for example, above equation 3, based on the minimum CCE index number input from the PDCCH demodulation section 405 and parameters included in the higher layer control information.

Also, with the present embodiment, the PUCCH resource determining section 412 determines PUCCH resources to use to transmit delivery acknowledgment information as shown in FIG. 10 and FIG. 11, based on the offset values associated with the ARIs (resource identifiers). Here, the ARIs are added to the downlink control information that is blind-decoded in the enhanced PDCCH demodulation section 407.

Also, with the present embodiment, the PUCCH resource determining section 412 determines PUCCH resources to use to transmit delivery acknowledgment information in accordance with, for example, above equations 2, 4 and 5, based on the minimum eCCE index number input from the enhanced PDCCH demodulation section 407, parameters included in the higher layer control information and the total number of CCEs that form the PDCCH. Note that, when the PDCCH is not placed over maximum three OFDM symbols from the subframe top, the total number of CCEs may be omitted. The determining section of the present invention is formed with the PUCCH resource determining section 412.

The mapping section 413 maps the uplink control information output from the modulation section 411, to the PUCCH resources determined in the PUCCH resource determining section 412. The IFFT section 414 converts input data matching the system band into time sequence data by performing an inverse fast Fourier transform, and the CP inserting section 415 inserts cyclic prefixes in the time sequence data per data division.

As has been described above, with the radio communication system 1 according to the present embodiment, to downlink control information, the radio base station 10 adds ARIs being different between a plurality of enhanced PDCCH sets that are configured for the user terminal 20, per enhanced PDCCH set. The user terminal 20 determines PUCCH resources based on the offset values that are associated with the ARIs added to the downlink control information. Consequently, when a plurality of enhanced PDCCH sets are configured for the user terminal 20, it is possible to prevent collisions of PUCCH resources between the plurality of enhanced PDCCH sets. Also, it is possible to reduce the increase of overhead.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-162820, filed on Jul. 23, 2012, including the specification, drawings and abstract, is incorporated herein by reference in its entirety.

The invention claimed is:

1. A radio communication method in a radio communication system in which a radio base station transmits downlink control information using an enhanced downlink control channel (ePDCCH) that is frequency-division-multiplexed with a downlink shared data channel, the radio communication method comprising the steps of:
configuring, by the radio base station, a first and a second ePDCCH resource set for a user terminal, each of the first and the second ePDCCH resource set consisting of a predetermined number of enhanced control channel elements having the same sequential index numbers;
transmitting, by the radio base station, the downlink control information added with a resource identifier, to the user terminal; and
determining, by the user terminal, a radio resource for an uplink control channel that is used to transmit delivery acknowledgment information of the downlink shared data channel, based on an offset value that is associated with the resource identifier,
wherein the offset value is configured based on the predetermined number of enhanced control channel elements for each of the first and the second ePDCCH resource set.

2. The radio communication method according to claim 1, wherein
the radio resource for the uplink control channel is determined based on the index numbers of the enhanced control channel elements where the downlink control information is mapped.

3. The radio communication method according to claim 1, wherein the resource identifier is an ACK/NACK resource indicator (ARI).

4. A radio base station that transmits downlink control information using an enhanced downlink control channel (ePDCCH) that is frequency-division-multiplexed with a downlink shared data channel, the radio base station comprising:
a processor that configures a first and a second ePDCCH resource set for a user terminal, each of the first and the second ePDCCH resource set consisting of a predetermined number of enhanced control channel elements having the same sequential index numbers; and
a transmitter that transmits, to the user terminal, the downlink control information added with a resource identifier,
wherein the resource identifier is associated with an offset value of a radio resource for an uplink control channel that is used to transmit delivery acknowledgment information of the downlink shared data channel, and
the offset value is configured based on the predetermined number of enhanced control channel elements for each of the first and the second ePDCCH resource set.

5. A user terminal that receives downlink control information using an enhanced downlink control channel (ePDCCH) that is frequency-division-multiplexed with a downlink shared data channel, the user terminal comprising:
a receiver that receives, from a radio base station, the downlink control information added with a resource identifier; and
a processor that determines a radio resource for an uplink control channel that is used to transmit delivery acknowledgment information of the downlink shared data channel, based on an offset value that is associated with the resource identifier,
wherein a first and a second ePDCCH resource set are configured, each of the first and the second ePDCCH resource set consisting of a predetermined number of enhanced control channel elements having the same sequential index numbers, and
the offset value is configured based on a total the predetermined number of enhanced control channel elements for each of the first and the second ePDCCH resource set.

6. A radio communication system in which a radio base station transmits downlink control information using an enhanced downlink control channel (ePDCCH) that is frequency-division-multiplexed with a downlink shared data channel, the radio communication system comprising:
the radio base station comprising:
a first processor that configures a first and a second ePDCCH resource set for a user terminal, each of the first and the second ePDCCH resource set consisting of a predetermined number of enhanced control channel elements having the same sequential index numbers; and
a transmitter that transmits, to the user terminal, the downlink control information added with a resource identifier; and
the user terminal comprising:
a second processor that determines a radio resource for an uplink control channel that is used to transmit delivery acknowledgment information of the downlink shared data channel, based on an offset value that is associated with the resource identifier,
wherein the offset value is configured based on the predetermined number of enhanced control channel elements for each of the first and the second ePDCCH resource set.

7. The radio communication method according to claim 1, wherein the radio resource for the uplink control channel is determined based on a parameter provided by higher layer signaling.

8. The radio communication method according to claim 2, wherein the resource identifier is an ACK/NACK resource indicator (ARI).

9. The radio communication method according to claim 7, wherein the resource identifier is an ACK/NACK resource indicator (ARI).

10. The radio communication method according to claim 7, wherein the radio resource for the uplink control channel is determined based on the index numbers of the enhanced control channel elements where the downlink control information is mapped.

* * * * *